United States Patent
Ohara et al.

(10) Patent No.: US 7,133,558 B1
(45) Date of Patent: Nov. 7, 2006

(54) DEVICE PROCESSING A TABLE IMAGE, A MEMORY MEDIUM STORING A PROCESSING PROGRAM, AND A TABLE MANAGEMENT PROCESSING METHOD

(75) Inventors: Atsuko Ohara, Kawasaki (JP); Satoshi Naoi, Yokohama (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/410,626

(22) Filed: Oct. 1, 1999

(30) Foreign Application Priority Data

Dec. 16, 1998 (JP) ............................................ 10-357023
Feb. 26, 1999 (JP) ............................................ 11-049502

(51) Int. Cl.
*G06K 9/48* (2006.01)
*G06K 9/34* (2006.01)

(52) U.S. Cl. ........................................ 382/199; 382/175
(58) Field of Classification Search ................. 382/175, 382/176, 177, 178, 199, 185, 186, 187, 266, 382/270
See application file for complete search history.

(56) References Cited

U.S. PATENT DOCUMENTS

| | | | | |
|---|---|---|---|---|
| 5,228,100 A | * | 7/1993 | Takeda et al. | ............... 382/175 |
| 5,857,034 A | * | 1/1999 | Tsuchiya et al. | ............ 382/175 |
| 5,896,464 A | * | 4/1999 | Horiuchi et al. | ............. 382/178 |
| 6,035,061 A | * | 3/2000 | Katsuyama et al. | ........ 382/177 |
| 2002/0021840 A1 | * | 2/2002 | Ohara et al. | ................. 382/199 |

FOREIGN PATENT DOCUMENTS

| | | | |
|---|---|---|---|
| JP | 06309498 A | | 11/1994 |
| JP | 07014000 A | | 1/1995 |
| JP | 07028937 A | | 1/1995 |
| JP | 07192094 A | | 7/1995 |
| JP | 07282191 A | | 10/1995 |
| JP | 07 282191 | * | 10/1995 |
| JP | 08212292 A | | 8/1996 |
| JP | 09050527 A | | 2/1997 |
| JP | 10334185 A | | 12/1998 |

* cited by examiner

*Primary Examiner*—Mehrdad Dastouri
(74) *Attorney, Agent, or Firm*—Staas & Halsey LLP

(57) ABSTRACT

A table image processing device processes a table image and a memory medium stores a processing program. The table image processing device processes precisely a table image containing a round corner and includes a device extracting a line extracting a longitudinal line and lateral line out of an input image, a device finding a potential match of a round corner region extracting an oblique line which commences from a terminal of a line found by the line extracting device, and finding the potential match of the round corner region, a device extracting a cell containing the potential match of the round corner found by the potential match of the round corner region finding device, and a device deciding the round corner part deciding the round corner from the cells found by the device extracting the cells.

24 Claims, 18 Drawing Sheets

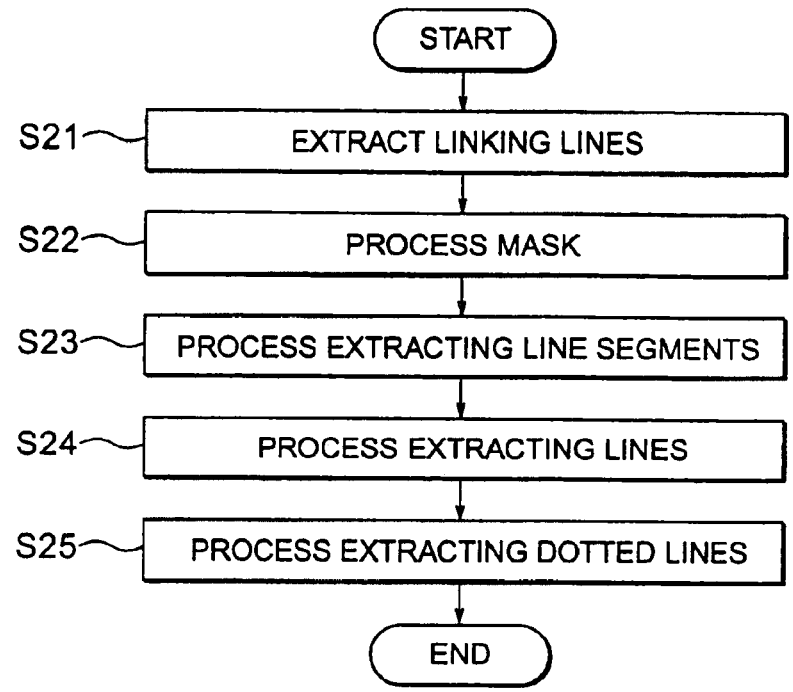
FIG.6(A)
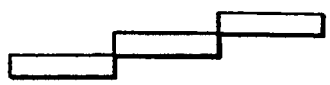
FIG.6(B)
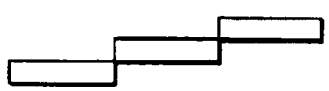
FIG.7(A)
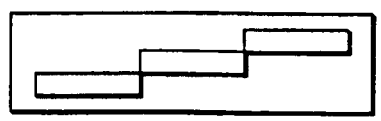
FIG.7(B)

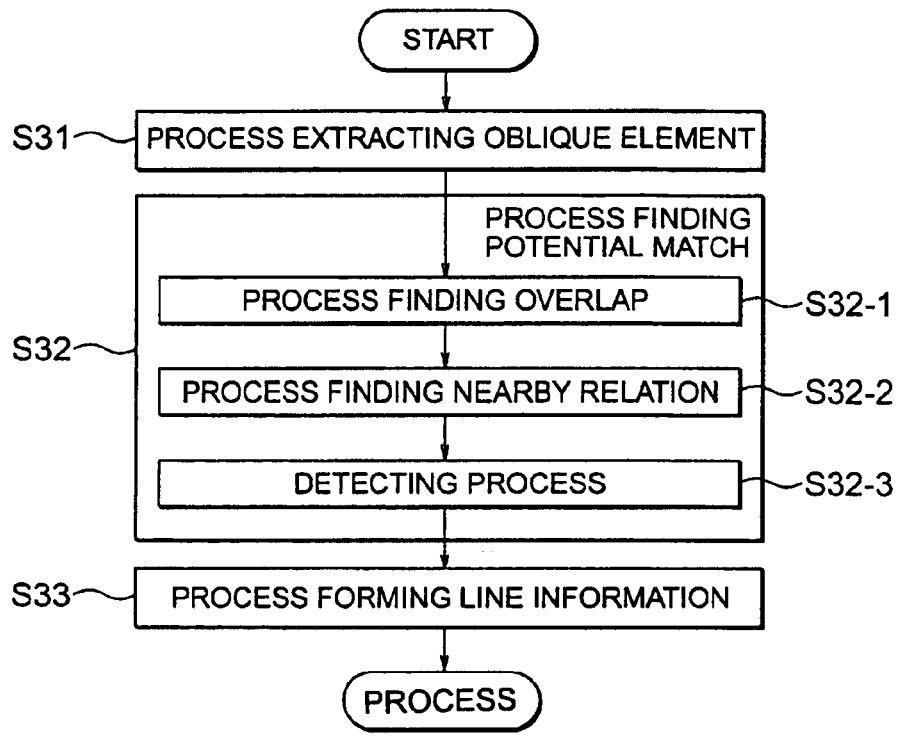
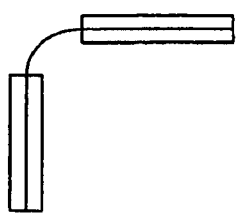 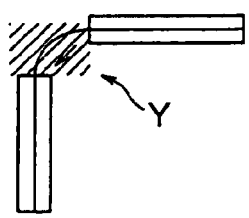 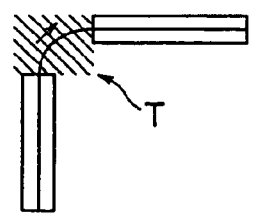

FIG. 18
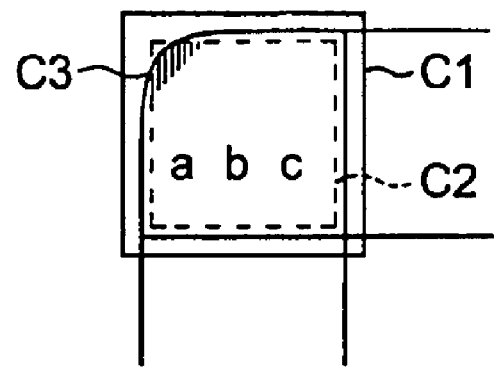
FIG. 19(A)  FIG. 19(B)
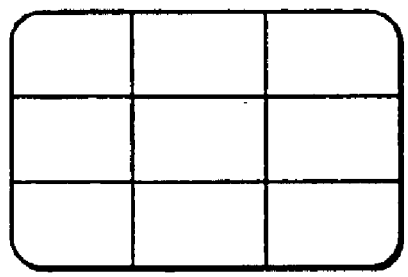
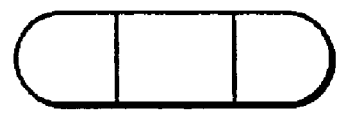

DEVICE PROCESSING A TABLE IMAGE, A MEMORY MEDIUM STORING A PROCESSING PROGRAM, AND A TABLE MANAGEMENT PROCESSING METHOD

BACKGROUND OF THE INVENTION

1. Field of the Invention

The present invention relates to a device processing a table image and to a memory medium storing a processing program, and particularly, to a device processing a table image and a memory medium storing the processing program which processes exactly a table image containing round corners, and decides whether a potential match of a ruled line is a true ruled line.

2. Description of the Related Art

A character recognition device or optical character recognition (OCR) device, is generally used as an input device for a computer. The character recognition device recognizes characters by a very high recognition rate if the characters are written clearly in directed regions of a sheet etc., of a document, on which the region for writing letters is specified. The document is that which the color and color density of a ruled line like the frame, etc. are the same as letters and are black and do not drop out color.

But, for the letters being written even a little out of the directed region, the recognition rate is much lower. For example, it happens in the case that the letter contacts the frame (or the ruled line) defining the region of the table with the ruled line of the table, or is written out of the region of the table defined by the ruled lines.

Therefore, the technique by which frames in table form are exactly extracted even if the position and format etc, are unknown on a sheet, and letter regions are exactly extracted even if the frame is in contact with a letter or a letter is written out of the frame.

There are many kinds of sheets, and in these sheets, there is a sheet in table form having round corners like an arc (hereafter referred to as a round corner or a round corner part), which is not different from a right angle corner of two lines. An example of the table form of the round corner is known in FIGS. 19A and 19B. The sheet having this form is used widely at the present time. The device processing a table like the character recognition device which cannot recognize the round corner causes troubles in the sheet processing therefore. There are many proposals for processing precisely the sheet having the round corners of table form.

It has been proposed as a technique that, after extracting a longitudinal ruled line and a horizontal ruled line or, a longitudinal and a lateral ruled line, and in the case that the longitudinal and lateral ruled line are arranged within a constant space without crossing each other, a part is recognized as a round corner (for example, refer to Japanese Laid Open Patent Application 282191/7 etc.). But, first, by this technique it happens frequently not to recognize precisely the round corner part in the case of the image being dulled. Particularly in case of the round corner part being dulled, it cannot process precisely. Second, on a condition applying the technique, both of the longitudinal ruled line and the lateral ruled line should be extracted. This technique can be applied to a sheet form shown in FIG. 19(A), but it cannot be applied to a sheet shown in FIG. 19(B) in which a longitudinal ruled line does not exist in itself, therefore.

It has also been proposed as a technique which, after extracting a longitudinal ruled line and a lateral ruled line (longitudinal and lateral ruled line), in the case that the longitudinal and the lateral ruled lines are arranged within a fixed space without crossing each other, decides the shape of the corner (round corner) by finding a pattern of the part matching with a previously prepared pattern, (for example, as disclosed in Japanese Laid Open Patent Application 14000/7). But, first it needs many patterns prepared in advance and consequently the memory size requirements become very great. Second, on a condition applying the technique, both of the longitudinal ruled line and the lateral ruled line should be extracted. This technique can be applied to the sheet form shown in FIG. 19(A), but it cannot be applied to a sheet shown in FIG. 19(B) in which a longitudinal ruled line does not exist in itself, therefore.

Further it has been proposed as a technique of, after extracting longitudinal and lateral ruled lines, finding a region or cell of which four sides are enclosed by the four ruled lines, and deciding whether the corner is a round corner or not by investigating the direction change in searching the inner side of the outline of the region (for example, refer to Japanese Laid Open Patent Application 212292/8). But in this technique, first in the case that a letter is in contact with the ruled line, the part is decided wrongly as a round corner by changing the search direction at the contact part of the letter, it cannot be exactly processed. As the contact of a character with a ruled line happens many times, the problem of wrong recognition caused by the contact should not be disregarded. Second, in a case of the existence of unclearness in the image, because the search direction is changed at the part, the part is wrongly recognized as a round corner, and it cannot be processed precisely. That is, when a ruled line which is a line in itself is not clear, the search direction is changed to 180° at the unclear part, so that the part is wrongly recognizes as a round corner. Further a ruled line of dotted line cannot be extracted.

As mentioned above, in the prior art device for processing a table image like a character recognition device, etc., the round corner cannot be processed exactly in case of existence of an unclear ruled line, round part of letters, contact between a ruled line and a letter, etc., even if the importance of recognizing the round corner is known fairly.

On the other hand, as another technique, within a potential match of ruled lines obtained by result of various kinds of extraction of the ruled lines, a potential match of the ruled lines of low possibility are neglected by finding the low potential match of ruled lines. That is, various techniques which abstract exactly the ruled line even on conditions like existence of contact of a letter and a frame, or existence of a letter over line are proposed.

For example, a technique has been proposed which calculates roughness of an image pattern (such as a degree of roughness in a region of the image pattern) by searching the extracted image pattern as a potential match of a ruled line, and decides it as a pattern not being a ruled line (that is a letter) in case of the roughness more than a fixed value (threshold), and decides it as ruled line in case of the roughness less than the fixed (refer to, for example, Japanese Laid Open Patent Application 334185/10). The technique is based on the roughness of an image pattern of a letter being great, and roughness of an image pattern of a ruled line being small. But, the technique uses rigidly fixed threshold in advance to decide the above mentioned decision, it happens for a case impossible for deciding ruled line or patterns except the ruled line, therefore.

FIGS. 24(A)–24(D) show examples of characters written in sheet, using Japanese characters. Examples of FIGS.

24(A)–24(D) are used to the explanation deciding roughness of ruled lines recognized by the prior art technique and present invention.

FIG. 24(A) shows a part of a line segment of letter A extracted as a potential match of a ruled line, and that which a part of an image pattern of a horizontal line of plural letters written very close is decided as a region of a potential match of a ruled line (the rectangular region marked off in the Figure) 131. In a region of the potential match of the ruled line 131, the pixel density of the line segment of letter A is greater degree than that of a line drawn accidentally, and therefore shows a line form. It is extracted as a ruled line therefore. Though the roughness of the line segment of the letter A is high in itself, it is shown fairly low. FIG. 24(B) shows a part of line B extracted as a potential match of a ruled line, and in a region of the potential match of the ruled line 132 (the rectangular region marked off in the Figure), the position of the image pattern fluctuates fairly up and down in view of the pixel. The line B is disordered greatly, but it is a line in itself, so that it needs to be extracted as a line. Though the roughness of the line B is low in and of itself, it is high in the example shown, so that both of the roughness shown in FIG. 24(A) and (B) are same value. In the above mentioned technique, the threshold is set so as the ruled line to be extracted exactly. As the result of the above mentioned decision, a line segment of letter A having the fairly low roughness same as the line B is found as the potential match of the ruled line. That is, in the case of the line segment of the letter A, the pattern decision whether a ruled line or a pattern except a ruled line is impossible.

FIGS. 25(A)–25(D) show examples of characters written in sheet, using Japanese characters. Examples of FIGS. 25(A)–25(D) are used to the explanation deciding roughness of ruled lines recognized by the prior art technique and present invention.

Especially, FIGS. 25(A)–(D) show an example in which a letter is recognized as a ruled line, and FIGS. 26(A)–(D) show an example in which a ruled line is recognized as a letter. As an original image (input image) of FIG. 25(c), there is a case that letter 152 exists between the ruled lines and the letter is crushed. When the image is read by a scanner, the image data shown in FIG. 25(B), which is crushed to the degree of unclearness in the character part 151, is formed. If the character part 151 is not crushed, a roughness of the character is high, but, in this case, the roughness of the part 151 is low, because of the crush. In the prior art of the above mentioned Japanese Laid Open Patent Application, the threshold is fixed high, so that part of the letter is decided as a potential match of the ruled line.

FIGS. 26(A)–26(D) show examples of characters written in sheet, using Japanese characters. Examples of FIGS. 26(A)–2(D) are used to the explanation deciding roughness of ruled lines recognized by the prior art technique and present invention.

On the contrary, in an original image of FIG. 26(C), there is a case that the intermediate part 144,145 of the line is unclear. When the image is read by a scanner, an image data shown in FIG. 26(B) is formed, and the unclear part does not show any line in view of the pixel. If the part 144,145 is not unclear, a roughness of the part is low, but, in the case, the roughness of the part is high, because of the unclearness. Therefor, by the above mentioned technique, the unclear part is decided as a narrower ruled line than in it self, or a letter having a great roughness and it is rejected from the potential match of the ruled line. In this case, also, it is impossible to decide a ruled line or a pattern other than the ruled line.

As mentioned above, in the prior art of the device for processing table image like the character recognition device etc., it cannot decide the potential match of a ruled line because of the continuation of a line part of a letter, a disturbance of a line (ruled line), a crush of a letter, unclearness of a ruled line etc., even if the process for finding the round corner is so important and is fairly well-known.

SUMMARY OF THE INVENTION

An object of the present invention is to provide a device processing a table image, a memory medium storing a processing program, and a table image processing method, each of which processes precisely a table image containing round corners.

Another object of the present invention is to provide a device processing a table image, a memory medium storing a processing program, and a table image processing method, each of which processes precisely a table image, and each of which decides precisely a potential match of a ruled line.

Another object of the present invention is to provide a device processing a table image, a memory medium storing the processing program and a table image processing method, in which the round corner can be processed exactly even in a case of existence of an unclear image, and can process exactly in a condition that only one of a longitudinal ruled line or a lateral ruled line is extracted.

Another object of the present invention is to provide a device processing a table image, a memory medium storing the processing program and a table image processing method, in which a large memory size is not necessary, as it is not necessary to have many matching patterns by generating automatically the matching.

Another object of the present invention is to provide a device processing a table image, a memory medium storing a processing program and a table image processing method, in which the round corner part can be processed exactly, as it does not recognize incorrectly a contact part of a ruled line with a letter, or a unclear part of the image pattern.

Another object of the present invention is to provide a device processing a table image, a memory medium storing the processing program and a table image processing method, in which the device for processing table image can process exactly the round corner, even if there is an unclearness of a ruled line, a round part of a letter and a contact of a ruled line with a letter, and as a result, the recognition of the ruled line format and extraction of cells (regions for the letter recognition) is accomplished.

Another object of the present invention is to provide a device processing a table image, a memory medium storing the processing program and a table image processing method in which a region not being potential match ruled line is found precisely and is neglected precisely from the potential match of the ruled line.

Another object of the present invention is to provide a device processing a table image, a memory medium storing the processing program and a table image processing method, in which the case of the impossibility of the determination to be ruled line or not is greatly reduced for, and the ruled line is extracted precisely.

For realizing the above mentioned objects, the present invention includes following principle components.

A table image processing device comprises a unit extracting a line extracting the longitudinal line and lateral line from an input image, and unit for finding a potential match of a round corner region extracting an oblique line which commences from a terminal of a line found by the line extracting unit, and finding a potential match of the round corner region based on the oblique line, unit extracting a cell finding cells containing the potential match of the round corner found by the potential match of the round corner region finding unit, and a unit deciding a round corner part based on the cells found by the cell extracting unit.

A table image processing device includes a potential match of a round corner finding device, wherein the potential match of the round corner finding device extracts a first oblique element commencing from a terminal of longitudinal line and a second oblique element commencing from a terminal of lateral line each from the lines extracted within the input image, and, in case that the first oblique element and the second oblique element overlap, the overlapping part being decided as the potential match of the round corner region.

A table image processing device includes a potential match of a round corner finding device, wherein the potential match of the round corner finding device comprises a unit extracting a first oblique element commencing from a terminal of a longitudinal line, and a second oblique element commencing from a terminal of a lateral line each from the lines extracted from the input image, and, in case that the first oblique element and the second oblique element are within a distance fixed in advance and a pattern showing a line feature exists, or contact or overlap each other, the part being decided as the potential match of the round corner region.

A table image processing device includes a potential match of a round corner finding device, wherein the potential match of the round corner finding device comprises a unit extracting a first oblique element commencing from a terminal of a longitudinal line, and a second oblique element commencing from a terminal of a lateral line within the lines extracted from the input image, and, in case that any oblique element does not exist near an identified oblique element and a patter showing a line feature exists at the terminal of the identified oblique line, the part being decided as the potential match of the round corner region.

The table image processing device provides a round corner deciding device, wherein the round corner deciding device comprises a unit deciding, concerning to a cell extracted from longitudinal lines and lateral lines extracted from an input image, in a case that the pixel density changes in an order fixed in advance at a corner of the cell, the part as the round corner.

The table image processing device provides a round corner deciding device, wherein the round corner deciding device comprises a unit deciding, concerning to a cell extracted from longitudinal lines and lateral lines extracted from an input image, in a case that the round corner decided based on the pixel density change exists, another corner part being decided as the round corner.

The table image processing device providing a round corner deciding device, wherein the round corner deciding device comprises a unit deciding, concerning to a cell extracted from longitudinal lines and lateral lines extracted from an input image, in a case that a pattern of nth order function generated between the lines in the cell matches the input image at a corner containing a potential match of a round corner region, the part as a round corner.

A memory medium storing a program for implementing in a computer of a table image processing device, wherein the program comprises extracting lines of longitudinal line and lateral line within an input image, and finding a potential match of a round corner region by extracting an oblique line which commences at a terminal of a line extracted by the process for extracting lines, and finding a potential match of a round corner region by fixed process using the extracted oblique line, finding cells containing the potential match of the round corner region found by the process for finding the potential match of round corner region, and deciding a round corner part by fixed process for the corner of cells extracted by processing for extracting cell.

A table image processing device including a unit processing finding a ruled line, wherein the unit processing finding the ruled line comprises a unit, within potential matches of the ruled line of a longitudinal line and lateral line extracted from an input image, for finding whether the identified potential match of the ruled line is a ruled line or not based on roughness of the potential match of the ruled line and any one of threshold of different plural thresholds corresponding to an image pattern extracted from the input image pattern existing around the identified potential match of the ruled line.

A memory medium storing program for implementing in a computer of a table image processing device, wherein the program comprises, within the potential match of the ruled line of longitudinal line and lateral line extracted from an input image, finding whether the identified potential match of ruled line is a ruled line or not based on roughness of the identified potential match of the ruled line by using any one of threshold of different plural thresholds corresponding to an image pattern extracted from the input image pattern existing around the identified potential match of the ruled line.

A table image processing method comprising extracting a longitudinal line and lateral line out of an input image extracting an oblique line which commences from a terminal of a line found by the line extracting process, and finding a potential match of a round corner region based on the oblique line, extracting a cell containing the potential match of the round corner region, and finding the round corner of the cell.

A table image processing method for finding a ruled line comprising within potential matches of a ruled line of a longitudinal line and a lateral line extracted from an input image, finding whether an identified potential match of the ruled line is a ruled line or not based on a roughness of the potential match of the ruled line and one of a threshold of different plural thresholds corresponding to an image pattern extracted from the input image pattern and existing around the identified potential match of the ruled line.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 shows a flow of the line extraction process of the present invention.

FIGS. 6(A) and 6(B) shows a result of the process extracting segment line of the present invention.

FIG. 7(A) and 7(B) shows a result of the process extracting segment line of the present invention.

FIG. 8 shows a flow of the process extracting the potential match of the round corner of the present invention.

FIG. 9(A), FIG. 9(B) and FIG. 9(C) show enlarged Figures of an example of the round corner part of the present invention.

FIG. 18 shows an explanation of the process deciding a region for recognizing the character of the present invention.

FIG. 19(A) and FIG. 19(B) show examples of a table form having the round corner.

DESCRIPTION OF THE PREFERRED EMBODIMENTS

Figure 1:
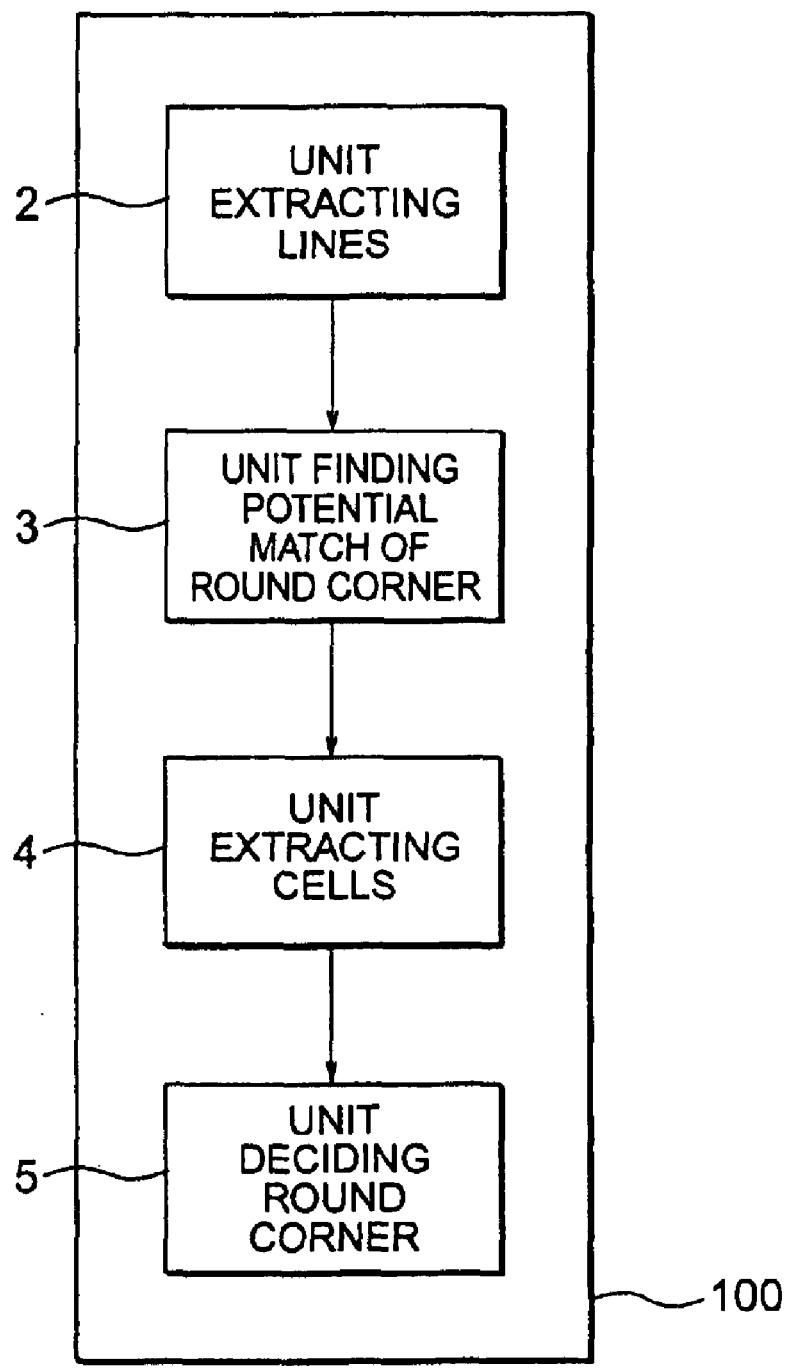
FIG. 1 shows first principle components of the present invention.

FIG. 1 shows a principle component of the fist embodiment of the present invention, and a component of a device processing a table image 100 of the present invention. The device processing the table image 100 provides a unit extracting lines 2 or extracting longitudinal lines and lateral lines from the input image, a unit finding potential match of a round corner 3 for finding an oblique element started from a terminal of the line extracted by the unit extracting the line 2 and finding potential matches of round corner, means for extracting the cells 4 for extracting a cell containing the potential match of the round corner region found by the unit finding the potential match of the round corner 4, and a unit deciding the round corner 5 for deciding a round corner from the cells extracted by a unit extracting the cell 4.

According to the device for processing the table image 100 shown in FIG. 1, for example, the round corner can be processed exactly even in a case of existence of an unclear image, and can process exactly in a condition that only one of a longitudinal ruled line or a lateral ruled line is extracted. Also, as it is not necessary to have many matching patterns (because of the matching pattern being automatically generated), a large memory size is not necessary.

Further, as it does not recognize incorrectly a contact part of a ruled line with a letter, or a unclear part of the image pattern, the round corner part can be processed exactly. Like this, the device for processing table image can process exactly the round corner, even if there is an unclearness of a ruled line, a round part of a letter and a contact of a ruled line with a letter, and as a result, the recognition of the ruled line format and extraction of cells (regions for the letter recognition) is accomplished.

The present invention provides a memory medium storing the processing program which realizes the device for processing the table image 100 by a computer. It provides easily the device for processing the table image 100.

Figure 2:
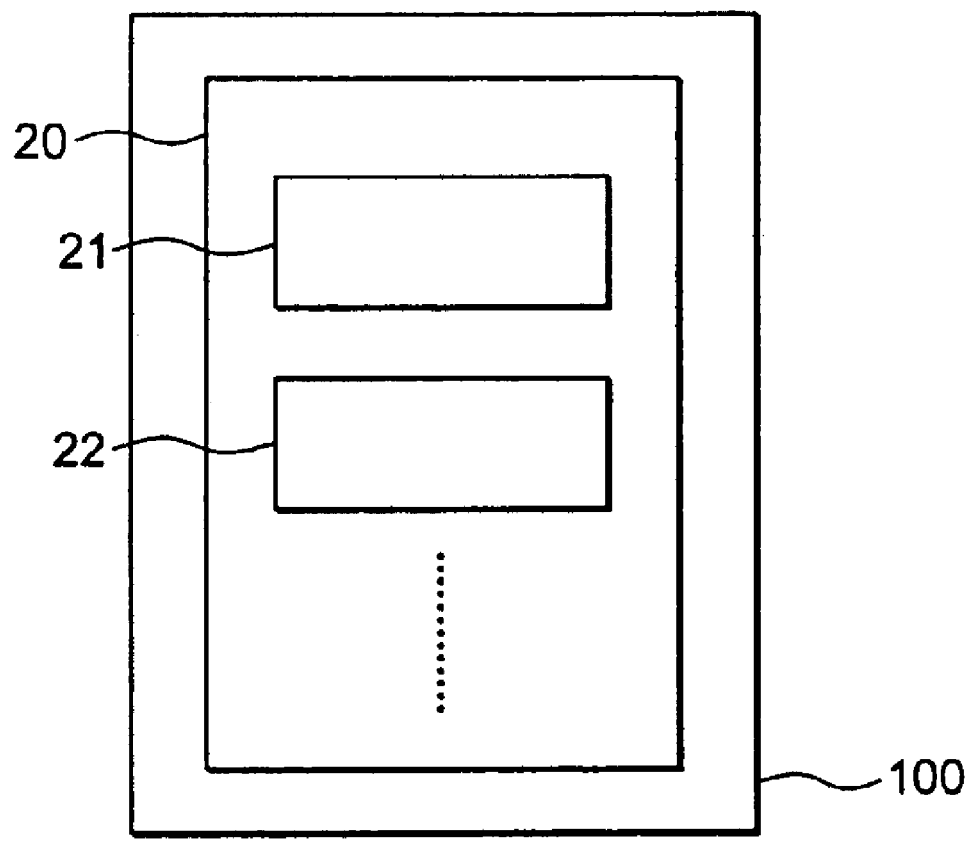
FIG. 2 shows second principle components of the present invention.

FIG. 2 shows a second principle components of the second embodiment of the present invention, and shows components of the device processing a table image 100. The device processing the table image 100 of the present invention comprises a unit finding a ruled line 20.

The unit finding a ruled line 20, concerning to the potential match of longitudinal ruled lines and lateral ruled lines, decides whether the potential match of the ruled line extracted from an input image is ruled line or not by roughness of the potential match of the ruled line, which is obtained by using one of threshold of plural thresholds 21,22, . . . chosen corresponding to image patters extracted form the input image and existing around the potential match of the ruled line.

According to the device processing the table image 100 of the present invention, one of the plural thresholds 21,22, . . . is used for deciding the ruled line according to image patterns existing around the potential match of the ruled line. For example, in case that the potential match of the ruled line of an image pattern that a lateral line of plural letters is written closely to each other, the roughness is low, but really an image pattern of a letter having a high roughness exists around it. Therefore, it is supposed that the roughness is high in itself. In this case, a lower threshold (for example the first threshold 21) is used for finding the potential match of the ruled line, therefore. Processing like this, the potential match of the ruled line, of which the roughness is lower than that in itself, can be neglected from the potential match of the ruled line. On the contrary, in case that the roughness of the neighborhood is lower than in itself, the high threshold (for example, the second threshold value 22) is used. Processing like thus, the potential match of the ruled line, of which the roughness is higher than in itself, is left in the potential match. As mentioned above, a region which is low potential match ruled line is found precisely and it is neglected from the potential match of the ruled line. Therefore, the case in which it is impossible to decide a ruled line or a pattern other than the ruled line is greatly reduced, and the ruled line is extracted precisely.

As an example, the present invention provides a memory medium storing the processing program which realizes the device for processing table image 100 by a computer. It provides easily the device for processing the table image 100.

The First Embodiment

Figure 3:
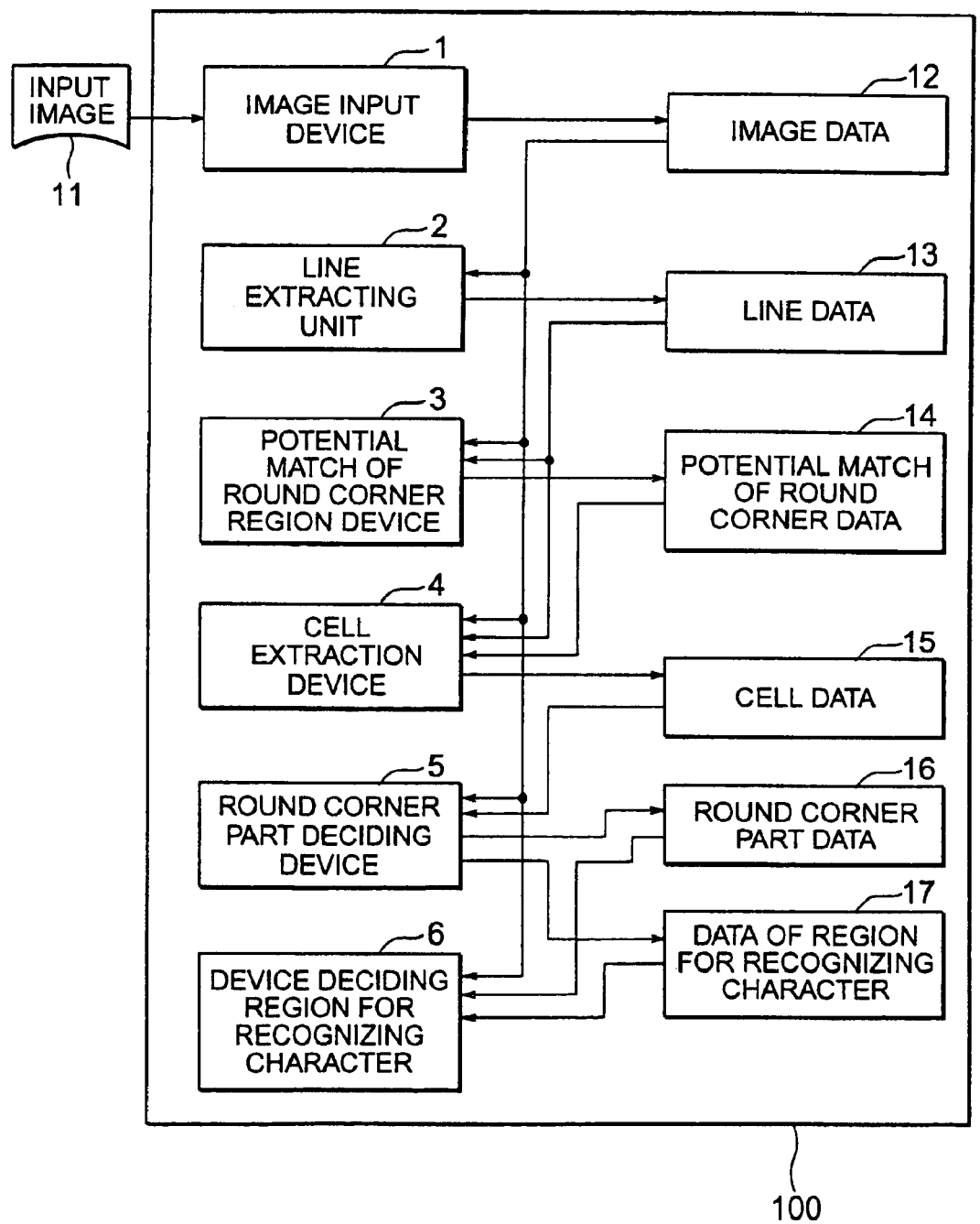
FIG. 3 shows components of the table image processing device of the present invention.

FIG. 3 shows components of the device of the first embodiment for processing a table image 100, and shows an example of the device for processing a table image 100 of the present invention, and it corresponds to the device for processing the table image 100 shown in FIG. 1. Preferably, the table image device 100 is a software program stored in a computer memory, and is executed by a processors.

The device processing a table image device 100 comprises an image input device 1, a unit for extracting a lines 2, a potential match of round corner region finding device 3, a cell extracting device 4, a round corner part deciding device 5, and a device deciding region for recognizing a character 6. The device for processing table image 100 comprises of a program for processing the table image in a main memory, and a CPU. A computer of the device for processing the table image 100 comprises an input device like a key board, a mouse, a scanner etc. for inputting an image to process the table image and inputting a direction, outputting devices for displaying the image etc. and auxiliary memory device for storing each kind data like an image data 12.

The image input device 1 of a unit for inputting an image input an input image 11 of a sheet including ruled lines as the image data 12. The image input device 1 includes a scanner etc. to read the input image 11 including longitudinal (vertical or y) and lateral (horizontal or x) ruled lines printed on a sheet etc. of paper, and letters written on the sheet, and inputs them as the image data 12 of an electronic image data. The input data 11 is not limited, for example, but preferably is two value image not having an extreme slant, like a sheet shown as examples in FIGS. 19(A) and 19(B).

A unit for extracting lines 2 of the device extracting line 2 references the image data 12 input from the image input device 1, and extracts longitudinal lines and lateral lines. The extracted data concerning to a line (a line data) 13 includes coordinates representing the line. The line data is stored in the auxiliary memory device.

The unit for finding a potential match of round corner 3, that is, the potential match of the round corner region finding device 3 references the image data 12 and the line data 13, and extracts an oblique element from a terminal point of the line extracted by the line extracting device (means for extracting lines) 2, and finds a potential match of the round corner by implementing an arranged process by using the extracted oblique element. The potential match of the round corner region 3 stores the potential match of the round corner as data of potential match of the round corner data 14. The potential match of the round corner data 14 includes, for example, data showing whether the oblique element is a potential match of the round corner or not, and of coordinates of the oblique element.

During the extraction of the oblique element, the potential match of the round corner region finding device 3 extracts a first oblique element of which the terminal point is a longitudinal line and a second oblique element of which a terminal point is a lateral element separately within the longitudinal lines and lateral lines extracted from the input image data 12 by the line extracting device 12. The potential match of the round corner finding device 3 implements the above mentioned process for finding the potential match of the round corner by any one of following processes from the first to the third. That is, the first process is that which decides the part as the potential match of the round corner in case of that the first element and the second element are overlapped. The second process decides the part as the potential match of the round corner in case that the positional relation of the first oblique and the second oblique element is less distance than a fixed distance, and that both have a pattern showing a line feature or both are contacted overlapped each other. The third process decides the part as the potential match of the round corner in a case that a different oblique element does not exist near the oblique element, and a pattern showing a line feature exists at the terminal of the oblique element.

The cell extracting device 4, that is, the unit for extracting cells 4 extracts a cell containing the potential match of the round corner (and another cell) founded by the potential match of the round corner region finding device 3. The data (cell data 15) of the extracted cell includes coordinates showing the cell position. The cell data is stored in the auxiliary memory device.

The round corner deciding device 5 of the unit for deciding the round corner 5 implements a prepared process for the cells (or the peaks) containing the potential match of the round corner extracted by the cell extracting device 4 referencing the image data 12, potential match of the round corner data 14 and the cell data. The round corner deciding device 5 decides the round corner part based on the data, and stores the decided round part in the auxiliary memory device as the round part data 16. By the way, a real cell data 15 contains the potential match of the round corner 14, so that the possible data 14 is not referred, and the cell data is referred.

The round corner deciding device 5 decides a round corner part by implementing a prepared process about corners of cells extracted based on the longitudinal and lateral lines from the input image data 12 by the cell extracting device 4. The round corner deciding device 5 implements a prepared process of any one of following process from the first to the third. That is, the first process is that which, in case that the pixel density changes in a fixed order at a corner part extracted by the cell extracting device 4, decides part as a round corner. The second process is that which, in a case of existence of the round corner decided based on the density change, decides the deferent corner of the input image as round corners. The third process is that which, in case that the input image matches with a pattern of $n^{th}$ order function generated between terminals of lines extracted by the line extracting device, decides the part as a round corner.

The region recognizing character deciding device 6 of the unit for deciding the region recognizing character decides the region for recognizing the character of the input image data 12 by implementing the prepared process by referring the image data 12, the cell data 15 and the data of the round corner part 16. That is, the region recognizing the characters is decided by eliminating the round corner part from the region recognizing character in the cells containing the round corner part decided by the round corner deciding device. The data of the decided region for recognizing the character (the data of region for recognizing the character 17) is stored in the auxiliary memory device. By the way, as a real data of the round corner part 16 contains the cell data 15, the cell data 15 is not referred and the data of the round part 16 is referred.

The line extracting device 2, the potential match of the round corner deciding device 3, the cell extracting device 4, the round corner deciding device 5 and the region for recognizing 6 are realized by a program existing on a main memory to be implemented by a CPU for implementing various process. The process implemented by the line extracting device 2, the process implemented by the cell extracting device 4, and the process implemented by the region for recognizing the character are well known process. The process implemented by the potential match of the round corner region finding device 3 and the round corner deciding device 5 are characteristic process of the present invention.

Figure 4:
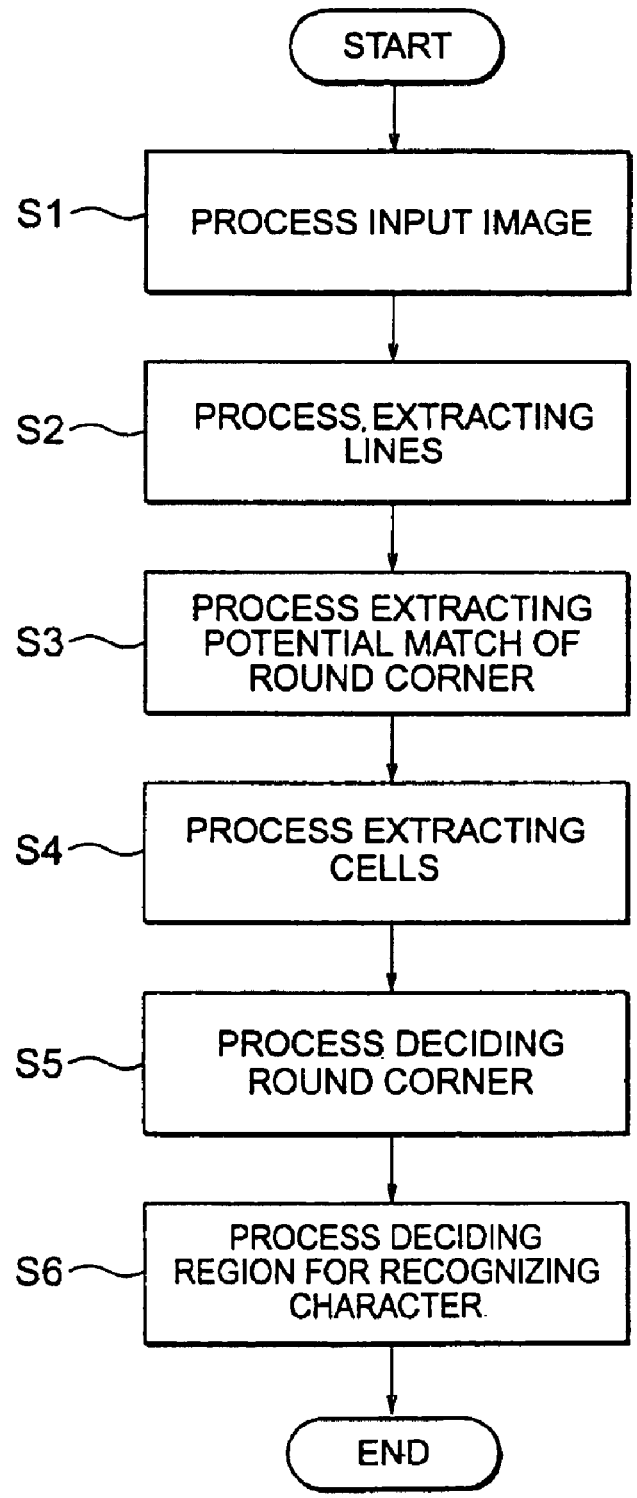
FIG. 4 shows a flow of the table image process of the present invention.

FIG. 4 shows a flow processing table image 100 which is implemented by the device processing the table image.

The image input device 1 implements the process inputting the input image 11 as the image data 12 (step S1). That is, it reads the input image 11 by a scanner and obtains the image data 12.

The line extracting device 2 implements the line extracting process for extracting the longitudinal and lateral lines (step S2). That is, the line data 13 is obtained. This process is explained later by referring FIG. 5 to FIG. 7.

The potential match of the round corner finding device 3 extracts the oblique element commencing from a terminal of the extracted line, and implements the process extracting the potential match of the round corner by a prepared process using the extracted oblique element (step S3). The process for obtaining the potential match of the round corner is explained later by referring to FIG. 8 to FIG. 12.

The cell extracting device 4 implements the process extracting cells (and another cells) containing the potential match of the round corner (step S4). Namely, the cell data 15 is obtained. This process is explained later by referring to FIG. 13.

The round corner deciding device 5 implements the round corner deciding process by processing a prepared process for the corner of cell containing the extracted potential match of the round corner region (step 5) referring to image data 12, potential match of round corner 14, and cell data 15. That is, the round corner data 16 is obtained. The process is explained later referring to FIG. 14 to FIG. 17.

The device deciding region recognizing the character 6 implements the process for deciding the region recognizing the character by a prepared process referring the image data 12, cell data 15 and the round corner data 16 (Step 6). That is the region recognizing the character data 17 is obtained. The process is explained later by referencing FIG. 18.

FIG. 5 shows a flow implementing the extracting process. The process shown in FIG. 5 corresponds to the step 2 of FIG. 4, and is well known technique. The longitudinal and lateral direction ruled line (the longitudinal and lateral ruled line) are extracted. The line extracting process can be implemented by any one of well known processes, but the best process is shown as an example.

At first, linking patterns are extracted (Step 21). The linking pattern is extracted by a well known linking pattern extracting process. The well known linking pattern extracting process is, for example, a technique described in a Japanese Laid Open Patent Application 28217/7 which is proposed by the applicant of the present invention is used. According to the invention, eight linking patterns are extracted by labeling. By the process, each pattern of longitudinal and lateral ruled line are certainly extracted without depending a relative positional relation of the plural frames.

Now, the linking pattern extracting process is explained briefly. In the input image data 12, for each pattern (a partial pattern) composing the input pattern, the linking relation with different patterns in eight directions of the upper and lower longitudinal, the left and right side and four oblique directions are investigated. Next, patterns linking in any direction (a linking pattern) are labeled with a same label. The linking pattern is a frame not contacted with a letter, that is a ruled line (or a part of the ruled line), a ruled line contacted with a letter (or a part of the ruled line) and a letter not contacted with a ruled line (or a part of the letter).

Next, the labeled partial patterns are investigated, and a group of connecting patterns having a size more than a fixed size is extracted as a the potential match of the ruled line forming a sheet. That is, within the extracted patterns, the patterns having more than a fixed size (the first partial pattern) is decided as the potential match of the ruled line of a sheet. For example, within real ruled lines, not an unclear ruled line correctly extracted is decided as a first partial pattern. On the other hand, within real letters, a letter written correctly without contacting with the ruled line is neglected from the potential match of the ruled line.

Next, labels attached to partial patterns existing at a fixed place for the first pattern and having more than a fixed size (the second partial pattern) are changed to a same label as the first pattern, and the second partial pattern is added to the potential match of the ruled line of the sheet. For example, patterns which are really the ruled line, but exist independent from the first pattern because of the unclearness, are decided as the second partial pattern of the ruled line. As the result, the unclear ruled lines are decided as the first partial pattern, that is, the potential match of the ruled line, a correct result is obtained therefore. Accordingly by using the linking pattern extracting process, it is prevented by the present invention that a pattern being a part of an identified ruled line, which is separated from the ruled line, is processed as a pattern other than the ruled line.

After this process, a subdivision of longitudinal and lateral direction element (a mask process) for each linking patter (the partial pattern) of the image of the extracted liking pattern (Step 22). The subdivision of a longitudinal and lateral direction element is implemented by a well known mask process. For example a technique proposed by the applicant of the present invention described in Japanese Laid Open Patent Application 28937/7 can be used as the well known mask process. By the technique, a pattern having an extraordinary oblique element is neglected from the extracted linking pattern. As the result, a frame, that is, a long line existing only as a part of the ruled line is easily extracted.

Now, the mask process is briefly explained. At first, a scan is implemented by using two kinds of masks of a long lateral size mask and a long vertical size mask having a fixed size (a length and width) for each partial pattern (a linking pattern) obtained by the labeling. Next, a pattern area within the pattern mask for the mask area is calculated by each mask, and when the rate is grater than a fixed value, all the inner region of the mask is deemed as a pattern (it deemed as a longitudinal element or lateral element of the image). That is, the part is deemed as a rectangular region devised by the size of the mask. When the rate is less than a fixed value, the pattern within the mask is neglected (it deemed for a longitudinal element or a lateral element of the image not to exist). By the process, the longitudinal element and lateral element of the image pattern are devised by the degree of the used mask width and extracted.

Next, when the rate of the plural rows (a longitudinal direction) or columns (a lateral direction) are successively greater than the fixed value, the areas are integrated and deemed as a rectangular region, and the center line of the rectangular region (FIG. 6(A)) is deemed as the processing result. Therefore, by using the mask process, the width of the frame, that is the width of the ruled lines, is made equal in a line, and it results to easy extraction of a long line composing the ruled line easy.

After the process, a line extracting step is implemented for the image obtained by the mask process (Step 23). The line extraction is implemented by a well known line extracting process of line. For example, a technique proposed by the applicant of the present invention described in Japanese Laid Open Patent Application 09498/6 is used. According to the technique, the adjacent projected value for the image processed by the mask process for the image is calculated or a line or a part of line (a line segment) is found. Now, the adjacent projection process is that which a projection of row or column around an identified region is added to a projection of row or column concerning to the identified row or column, and the value is defined as a projected value. A result of the line extraction process is shown in FIG. 6(B). As the peripheral of the identified line is found widely by this process, the segment line is extracted exactly.

Now, the segment extraction process is briefly explained. The lateral projection and longitudinal projection for each rectangular region pattern obtained by the result of the mask process (a whole inner region of the mask is deemed as a pattern) is obtained and the projection value is calculated. Next, the obtained projected value is added to a projection value of the pattern around the identified pattern (a identified row or column) within a fixed region. That is, the projection value of row and column of the patter according to an equation defined in the Japanese Laid Open Patent Application 309498/6 (for example equation (11)).

Next, a ratio of the calculated adjacent project value of the row direction for the divided length of the lateral direction of the rectangular region (mask) is calculated, and a ratio of the calculated adjacent project value of the column direction for the divided direction of the longitudinal direction of the rectangle (mask) is calculated. Next, a part of which the ratio is greater than a fixed value is deemed as a ruled line, and a part of which the ratio is less than a fixed value is deemed as the region that a line segment does not exist. Further when the plural parts are successively greater than the threshold value, that is, the potential match of the ruled line succeeds, these areas are integrated to a rectangular region, and deemed the rectangle as a line exists in the approximated rectangular region. That is, a segment line approximated by the rectangular region is extracted as shown in FIG. 6(B).

Even if the line exists on plural rows or columns for the reason of slant, the line can be extracted by using the segment extracting process. As the result, even if a great frame, that is a ruled line has a slant, the segment can be extracted exactly. Also it is not necessary to extract the slant line like the usual projection by great division numbers based on a short length of mask division, so that a long segment line can be extracted without extracting the short segment composing letters by using the adjacent projection.

After the process, a line extracting process can be implemented by using the result of the segment extraction (Step 24). The line extraction is implemented by a well known line extracting process. As a well known technique, a technique proposed by the applicant of the present invention described on the Japanese Laid Open Patent Application 309498/6 is used. By the technique, a long line is found by integrating the adjacent line segment each other within line segments extracted and approximated to a rectangle by the segment extracting process, and further the process for approximating to the rectangle is implemented to the found line. The result of the line extraction is shown in FIG. 7(A). By the process, a line can be extracted exactly.

Now the line extracting processing is briefly explained. At first, it is found whether the line segments extracted and approximated to the rectangle (shown in FIG. 7(A)) contact or not with another line existing upper and lower thereof (for example, within a range for the adding value in the process calculating the adjacent projection value). Next, when there is another line segment, the identified line segment and another segment line existing upper and lower thereof are integrated to a rectangular region as shown in FIG. 7(B). By the process, a long line of ruled line etc. of sheet is extracted.

By the way, the process after the process for calculating the ratio of the adjacent projection value to the divided length of the rectangle (mask) is processed in the line extracting process, not in the line segment line extracting process in Japanese Patent Application 309498/6. On the other hand, in the present invention, the line segment extracting process (step 23) and the line extracting process (step 24) are implemented successively, so that the present invention does not differ in essence in the process of the present invention from the process of Japanese Laid Open Patent Application 309498/6.

After the process, a process extracting dotted lines from the image data 12 is implemented by using the result of line segment extracting process (step S25). The process extracting dotted line is implemented by using a well known dotted line extracting process. The well known dotted line extracting process is for example a technique proposed by the applicant of the present invention described in Japanese Laid Open Patent Application 50527/9. By the technique, patterns where same size patterns are placed regularly are extracted as a solid dotted line and the patterns are approximated to same rectangle process as the line. The extracted line (a solid line) and the dotted line are implemented by same process as the ruled line without distinction between them. By the process, a sheet containing ruled lines of dotted lines can be processed exactly after the process.

Now the dotted line extracting process is briefly explained. At first, a first rectangle, which crosses vertically or laterally an outside line of the rectangle extracted and labeled by the linking pattern extracted process (step S21), is cut out. Next a pattern existing in the rectangle (inner pattern) is compared with a pattern fixed in advance and comprised of a dotted line, and a partial pattern coincident to the fixed pattern is found.

Next, when an inner pattern matching with the fixed pattern is found, the pattern is cut out as a second pattern crossing vertically the first pattern. Further, as inner pattern of the second pattern matching with the fixed pattern is cut out.

Next, in case that the extracted partial patters are placed in same distance and successively more than a fixed number, the patterns are supposed as a dotted line, and the rectangular region enclosing the dotted line is considered as a region existing the dotted line, and the rectangles enclosing the pattern are approximated to a rectangle containing the dotted line.

By repeating the dotted line extracting process, the dotted line existing in a sheet is exactly extracted, and the rectangle containing the dotted line is approximated by the rectangular approximation. As explained above, the solid lines and the dotted lines are processed with the same process, therefore.

As the result of the above mentioned process, within the image data 12, a line or a dotted line approximated to rectangles as shown right in FIG. 7 is extracted. This is the line data 13.

FIG. 8 shows a flow chart of the potential match of the round corner region finding process which is implemented by the potential match of the round corner region finding device. The process shown in FIG. 8 corresponds to the process of step 3 of FIG. 4, and it is a characteristic process of the present invention. The potential match of the round corner region finding process comprises an oblique element extracting process of a forgoing process, and the potential match finding process deciding a real potential match of the round corner region.

At first, an oblique element abstract process is implemented (step S31). The extracting process of the oblique element (an oblique line) commences from a terminal of a longitudinal and lateral line extracted in the process of the line extracting device 2. The oblique element extracting process uses a process of the pixel detecting process or the projection process of the oblique direction etc.

The pixel detection of the oblique element is processed by a well known process for detecting the pixel of the oblique direction. A technique proposed by the applicant of the present invention described in Japanese Laid Open Patent Application 192094/7 is used as the well known process for detecting the pixel of the oblique direction finding process. According to the technique, an oblique line is extracted by detecting the existence of a pixel (an out line of pattern) from the terminal point of the extracted line. By the process, an oblique element can be extracted, even if there are a little unclearness in the oblique line.

Now, the process for detecting the pixel of the oblique direction (the pixel of the oblique direction detecting process) is briefly explained. At first, a terminal of a longitudinal and lateral line extracted by the line extracting device 2 is set as a starting point (a commencing point). Next, a pattern of which out line commences from the terminal point of an extracted line without the identified line. That is, a line of pixels composing the image is traced from a lower side, from an upper side, from a left side or a right side of the line. Next, when it reaches to one of the line, or a longitudinal line or a lateral line other than the line, the detection is finished, and the result of the detection is decided as an oblique element.

Also, the projection of the oblique direction is implemented by using a well known technique of the adjacent projection process of the oblique direction. For example, a technique proposed by the applicant of the present invention described in Japanese Laid Open Patent Application 192094/7 is usable as a well known technique. According to the technique, the adjacent projection value of the image pattern of the image data 12 is calculated and an oblique line or a part of line (a line segment) is found by the rectangle approximation. In the technique, the adjacent projection is a process which obtains a projection value by adding the projection value of the notice oblique line to the projection value of the around region. According to the process, the oblique line can be extracted, even if the oblique element contains some unclearness.

Now the process of oblique direction projection is briefly explained. At first, each pattern patterns within the image data 12 other than the pattern decided as a line by the line extracting process (step S2) (a pattern corresponding to the line data 13) is divided by a fixed rectangle. Next a projection of a longitudinal direction and lateral direction is executed from the divided rectangle, and the projection value is obtained. Next the projection value of a longitudinal and lateral projection value of the rectangles existing within a fixed distance from the identified rectangle is added to the projection value of the identified rectangle. That is, an adjacent projection value of the oblique direction of the rectangle region (the oblique adjacent projection value) is obtained according to the equation described in Japanese Laid Open Patent Application 192094/7. For example, the projection angle is 45°.

Next the ratio of the calculated oblique adjacent projection value to the dividing length of the rectangle is calculated. A part of which the ratio is more than a threshold is decided as an oblique element, and a part of which the ratio is less than the threshold is decided as a part not having the oblique element. Next, when the plural parts have successively the projection value more than the threshold, that is, the oblique element part succeeds, these are integrated to an approximate rectangle region, and the oblique element exists in the approximated rectangle. The oblique element includes plural rectangles.

An oblique element of a slanting line is exactly extracted, by using the pixel detecting of the oblique direction, or the oblique (adjacent) projection process. An oblique element composing a round corner of a frame in a sheet is extracted exactly.

Concerning to the oblique element extracted by the oblique element extraction process, a first element which commences from a terminal of a line in longitudinal direction is called as "oblique element T". A second element which commences from a terminal of a line in lateral direction is called as "oblique element Y". They are distinct by describing like these.

FIGS. 9(A)–(C) shows an enlarged round corner. The part enclosed by dotted line in FIG. 9(A) is extracted as a longitudinal line and a lateral line (line data 13 of FIG. 3). Next as shown in FIG. 9(B), a line which extends in an oblique direction from a terminal of the lateral line is extracted, and as the result, the Y oblique element and its existing region (the region given the oblique line) are memorized. Next, in FIG. 9(C), a pattern which extends in an oblique direction from a terminal of a longitudinal line is extracted, and as the result, the oblique line element T is extracted and its existing region (an oblique line region) is stored in memory. By the way, concerning to the order of the extracting processes, any order which process is former or later is allowed. The process is implemented for all longitudinal lines and lateral lines. That is, the oblique elements, which are of one line in itself, are extracted separately as an oblique element T and an oblique element Y. By the process, even if an oblique element is unclear entirely, it is extracted as an oblique element T and an oblique element Y.

Figure 10A:
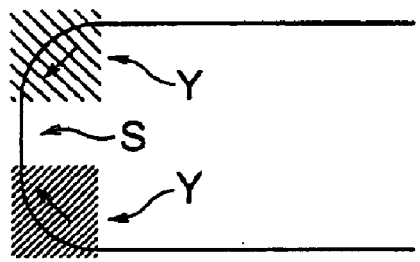
FIG. 10(A) and FIG. 10(B) show an example of the process of nearby relation of the present invention.

After the oblique element extraction process, the potential match finding process is implemented (step S32). The potential match finding process comprises one or plural of an overlap process, a neighbor process or a detecting process. The overlap process is explained by referring to FIGS. 9(A)–(C), the neighbor process and the detecting process are shown in FIGS. 10(A) and (B) and FIG. 11, respectively.

At first, the overlap process is implemented as a first process (step S32-1). The overlap process is implemented when, for example, an oblique element Y (a region of existence of element Y) shown in FIG. 9(B) and the oblique region T (a region of existence of element T) shows in FIG. 9(C) are overlapped. Accordingly, at first, it is found whether the overlap of the oblique element Y and the oblique element X exists or not at step S32-1. When the oblique element Y and the oblique element T overlap, the overlapping part is considered as a potential match of the round corner. Because, it results that the oblique element has a shape that a round corner should provide. That is, the oblique element is connected to the longitudinal line and the lateral line, and the round corner part is an element connecting both the elements. The round corner can be extracted exactly by the overlap process. When the overlapped oblique element does not exist, the neighbor process shown in FIGS. 10(A) and 10(B) is implemented.

By the way, the entire overlap of the oblique element Y and the oblique element T is not necessary, but they are considered to be overlapped, when the overlap is more than a fixed degree. The degree of the overlap is decided, for example, by overlap of the area, overlap of the pixels or overlap of rate. By the process, the oblique element can be extracted, even if there is the unclearness.

Next as the second process, the neighbor process is implemented (step S32-2). When two oblique elements Y (two regions of existence of the oblique element Y) exist in a longitudinal direction or two oblique elements T (two regions of existence of the oblique element T) are in a lateral direction less than a fixed distance. The neighbor process is implemented. Accordingly, at first in step S32-2, the distance of the oblique element Y or T of the identified region to the element Y or T of the neighbor region is investigated. When there is another oblique element Y or T satisfying the placement condition, one of the two different process is implemented according to the distance between the two regions Y or T as shown in FIGS. 10(A) and 10(B). When there is not the oblique element Y or T satisfying the placement condition, the detecting process shown in FIG. 11 is implemented.

Figure 10B:
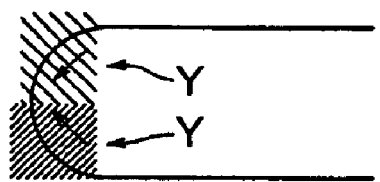
Figure 11:
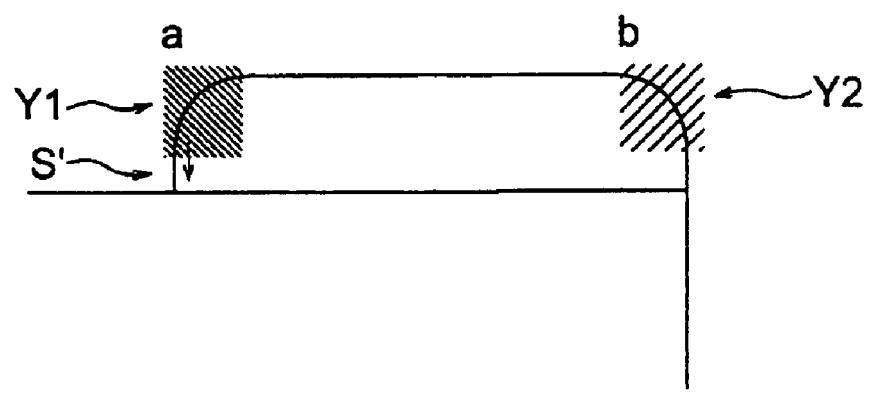
FIG. 11 shows an example of the process of detection of the present invention.

By the way, FIG. 10 shows a process in case that two oblique elements T are placed within a fixed distance each other in a lateral direction, but in case that two oblique elements T are placed within a fixed distance each other in a lateral direction, the process is same as the case of FIGS. 10(A) and 10(B). Also FIG. 11 shows the detection process of oblique element Y, but the detection process of oblique element T is same as the process of the oblique element Y.

In a case that the distance of the two oblique elements is less than a fixed value, but they are separated in a longitudinal direction as shown in FIG. 10 (A), a pattern existing between the two oblique elements are detected. When the pattern is not a pattern having a feature of line, process after the process are neglected. When the pattern is a pattern having a feature of a line, supposing an imaginary line between two oblique elements, two oblique elements Y are decided as the potential match of the round corner region. The imaginary line is decided as a potential match of the ruled line region. Next, it is investigated whether an image pattern S existing in the potential match of the ruled line region has the feature of a line or not. When it has a feature of a line, the region is extracted as a ruled line, and the oblique element of both the terminals Y is extracted as a potential match of the round corner region. By the process, it is prevented that a part of a character is extracted incorrectly as a round corner. Accordingly, when two oblique elements Y are placed in a longitudinal direction within a fixed value (or two oblique elements T are placed in a lateral direction within a fixed value), even if the line element does not exist almost between them and the form is nearly an arc, the potential match of the round corner region can be extracted exactly. It corresponds to a case of a sheet shown FIG. 19(A).

The process (the line detecting process) of determining whether the pattern S has the feature of a line or not is implemented by a well known line detecting process. A technique proposed by the applicant of the present invention described in Japanese Laid Open Patent Application 334185/10 may be used as the well known line detecting process. According to the technique, a line finding process is implemented by detecting the pixel or the roughness. By the process, distinction of a small roughness line or a great roughness line is possible, and whether the pattern has the feature of a line or not is exactly decided.

Now the line finding process by detecting the pixel and the roughness is briefly explained. At first the pixels (black pixel input as a pattern) are detected in a direction (a longitudinal or lateral) that the image pattern S which is an object of the detection in the input image data 12 extends. Next, as far as the pixel is found in the detecting direction, the detection in the direction has succeeded. In the process, the detecting direction does not change. On the other hand, only in a condition that a pixel does not exist in the detected direction, the pixel existing in an oblique direction to the detected direction is detected. In the case, the detected direction of the pixel changes. The numbers of change time of the detected direction are counted.

Next, based on the number of changes of the detected direction, whether the pattern S has the feature of a line or not is decided. When the pattern S is a line, the numbers of changes of the pixel in the detected direction is small because of a few direction change in the detection, and when it is not line, the value is great. By setting a suitable threshold for finding a line by experience in advance, it may be bound whether a pattern is line or not, therefore. It can be found, whether the objective pattern S is line or not, by using the line finding process by the pixel detection or the roughness.

In case shown in FIG. 10(A), without implementing the line detecting process for the pattern S existing between two regions Y, the region is decided as the round corners being close. In the case, the line (the ruled line) between two regions Y is created by the above mentioned method, or created in spite of existence of a pattern between two regions Y.

When there is a contact or overlap between two regions Y as shown in FIG. 10(B), two regions Y are considered as a round corner. Now, the contact means that the pixels comprising two oblique elements Y adjacent each other, and the overlap means that the pixels comprising two oblique elements Y overlap. These are a case that a longitudinal element of line between two lateral lines is too short to find a line. Therefore the process is implemented in case that the distance of two regions Y is less than a least distance to find a line. By the process, in cases that two oblique elements Y are contacts or overlap in a longitudinal direction, or two oblique elements T are contacts or overlap in a lateral direction, the potential match of the round corner can be found exactly. This corresponds to a sheet shown in FIG. 19(B).

Next the detecting process is implemented as the third process (step S32-3). The detecting process is implemented in case that an oblique element Y or T which is placed within a fixed from an identified oblique element Y or T does not exist as shown FIG. 11.

As shown in FIG. 11, when a different oblique element Y or T does not exist within a fixed distance from an identified oblique element Y1, does not exist, it is found whether a short line element exists or not at the oblique element Y1. When it is an oblique line, the longitudinal line is detected, and in a case of an oblique element T, a lateral line is detected. Now the process for finding existence of the short line (a short line detecting process) is implemented by using a well known short line detecting process. A technique proposed by the applicant of the present invention is used as a well known short line deciding process described in Japanese Laid Open Patent Application 334185/10. By the technique, a line finding process is implemented by the pixel detecting and the roughness. The process is explained above, so the explanation is neglected.

When the line exists, supposing the existence of a line at the place, the region is deemed as a potential match of the around corner. The supposed line is deemed as same line as the extracted line (the ruled line) by the line extracting process. By this, even if an oblique element does not exist near the extracted oblique element, when a pattern S' having features of line exists, the extracted oblique element can be decided the potential match of the round corner region. So even in the case that a line does not exist around the corner almost in a longitudinal direction and a lateral direction, and the corner is round, the potential match of the round corner region can be extracted. Even a short ruled line can be extracted therefore.

Now, the oblique element Y2 shown in FIG. 11 corresponds to the case shown in FIGS. 9(A)–9(C), and it is shown for reference. That is, it is a case that the oblique element Y1 cannot be extracted as a potential match of the round corner region by the overlap process or near process above mentioned.

Figure 12:
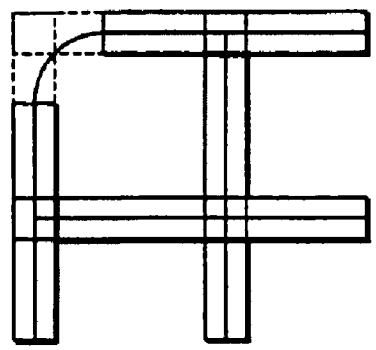
FIG. 12 shows the process finding the line information of the present invention.

A process for creating a line information for each oblique element extracted as the potential match of the round corner by the above mentioned each process (step S33). That is, the oblique element is decomposed to a longitudinal direction and a lateral direction, and each element is supposed as a line (a ruled line) of the longitudinal direction and the lateral direction. As an example, the supposed lateral line is obtained by varying the lateral coordinates value of the oblique element of the lateral direction to the lateral coordinate of the lateral line to which the oblique element contacts, keeping the longitudinal coordinate of the line to which the oblique element contacts. A supposed longitudinal line is obtained with the same process. As the result, two rectangle regions of the two lines are created (a region shown by a dotted line in FIG. 12). By the process, the line information concerning to the supposed line (the rectangle region) is created. The line information comprises a position coordinate of a commencing point and terminal point of the supposed line (the area of rectangle region). After the process, the supposed line and a real line (the rectangle region) shown by a solid line in FIG. 12 are integrated, and the cell extraction explained following is implemented by using the integrated result. By the process, the oblique element extracted as a potential match of a round corner region is processed as a supposed line, so that the cell extraction is implemented without considering the round corner part.

Now when a positional relation between the supposed line (the ruled line) and a real extracted ruled line are within a fixed distance each other, they are integrated to a line (ruled line) even if they are not contact or overlapped completely. Both the integration of the longitudinal and lateral direction is same process. So, in the integration process, the real ruled line and the supposed ruled line are treated in same process, and the cell extraction is implemented without considering the round corner.

Also, a process for calculating mean value of the size of oblique element extracted as the potential match of the round corner with the line information creating process. The mean value is used in a round corner deciding process mentioned later.

Also, as the line information creating process is a forgoing process of a cell extracting process explained later, it may be included in the cell extracting process. That is, it is possible for the cell extracting device to implement it.

Figure 13:
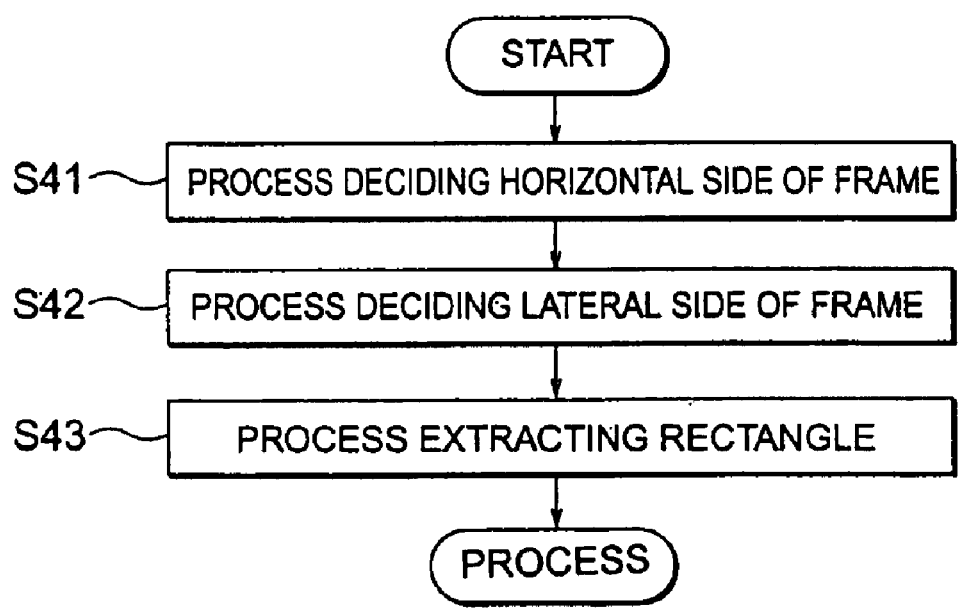
FIG. 13 shows a flow of the process extracting cells of the present invention.

As the result of the process mentioned above, a potential match of the round corner region at a corner of a sheet is extracted from the image data 12 of FIG. 13 by using the line data 13 of FIG. 3, and the line information about it is created. This is the potential match of the round corner data 14 of FIG. 3.

The cell extracting process implemented in the cell extracting device is explained in FIG. 13: A process shown in FIG. 13 corresponds to the process (step S4) shown in FIG. 4, and it is a well known technique.

The cell extracting device 4 extracts cells from the image data 12. Any well known technique may be used for the extracting process. The cell is a region of which four sides are rounded by lines, the cell is defined (extracted) by the two lateral lines (the lateral part of a frame) and two longitudinal lines (the longitudinal lines of a frame) therefore. An example is shown in following.

At first, a process for deciding the lateral side of the frame is implemented (step S41). The decision of the lateral frame is a well known lateral frame decision process. For example a technique described in Japanese Laid Open Patent Application 50527/9 proposed by the applicant of the present invention is usable. By the technique, a pair of two lateral lines (a pair) comprising a row is decided from the upper side according to a fixed order.

Now, the lateral frame deciding process is briefly explained. At first, from lateral lines extracted by the line extracting process (step S2), two lateral lines are chosen in order, these are potential matches of pairs of two lateral lines.

Next, when two lateral lines of the potential match are same length or a relation that the lower line is longer than the upper line (pair condition), the potential match is set as a pair of two lateral lines. When the lower line is longer, the lower line may be set the potential match of a pair of two lateral lines.

On the other hand, there is a relation that a lower line of two lateral line of the potential match is shorter, further the lower line and a line under the lower line are set as a potential match of a pair of two lateral lines. Like this, investigating the relation of the length of two lateral lines, the process is repeated until the pair condition is completed for two lateral lines so as to be set as the potential match of a pair of two lateral lines. By the way, when there is not at all the pair condition between a lower line and a line under the lower line, the lower line and the just upper line is set as a pair lateral lines.

Next after implementing the process on the lowest line, when an unprocessed line is left upper the line, the above mentioned process may be repeated by using the unprocessed line and a line which is possible to be a pair of two line of potential match lateral line with the unprocessed line, the pair of two lines are made. By using the process deciding the side frame, a pair of side frames (a pair of two lines) which compose row lines of a frame in a later process.

After this, a longitudinal deciding process for deciding the longitudinal frame is implemented by using the result of the lateral frame deciding process. The longitudinal frame deciding process is implemented by using a well known longitudinal lateral frame deciding process. For example, a technique described in Japanese Laid Open Patent Application 50527/9 proposed by the applicant of the present invention. By this technique, by each space of two lateral lines decided by the lateral side of the frame deciding process (that is, by each row line), the extracted longitudinal line of which a terminal of both of upper and lower reaches to the two lateral lines is decides as a longitudinal frame. The longitudinal line is extracted exactly by the longitudinal frame extracting process.

After the process, by using the result of the lateral frame deciding process and the longitudinal frame deciding process, the rectangle extracting process extracting the rectangle region of the cell is implemented (step S43). The extraction of the rectangle region is implemented by using a well known rectangle extracting process. A technique described in Japanese Laid Open Patent Application 50527/9 proposed by the applicant is used as the well known technique. By the processing technique described in Japanese Laid Open Patent Application 50527/9, a rectangle region enclosed by the lateral frame decided by the lateral the frame deciding process and the longitudinal frame decided by the longitudinal frame deciding process are extracted as a rectangle region. That is, a region which is enclosed by the two lateral lines set as a pair by the lateral frame deciding process and the two longitudinal lines decided by the longitudinal frame extracting process is extracted as a rectangle region. A cell is extracted exactly by the rectangle extracting process.

As the result of the above mentioned process, a cell of a sheet etc. is extracted from the image data 12 of FIG. 3 by using the image data 13 of FIG. 3. This is the cell data 15. In this process, a cell containing the round corner part of a sheet shown in FIG. 12 of FIG. 15 is also extracted as a rectangle frame by the supposed line formed by using the line information created in the step S33.

Figure 14:
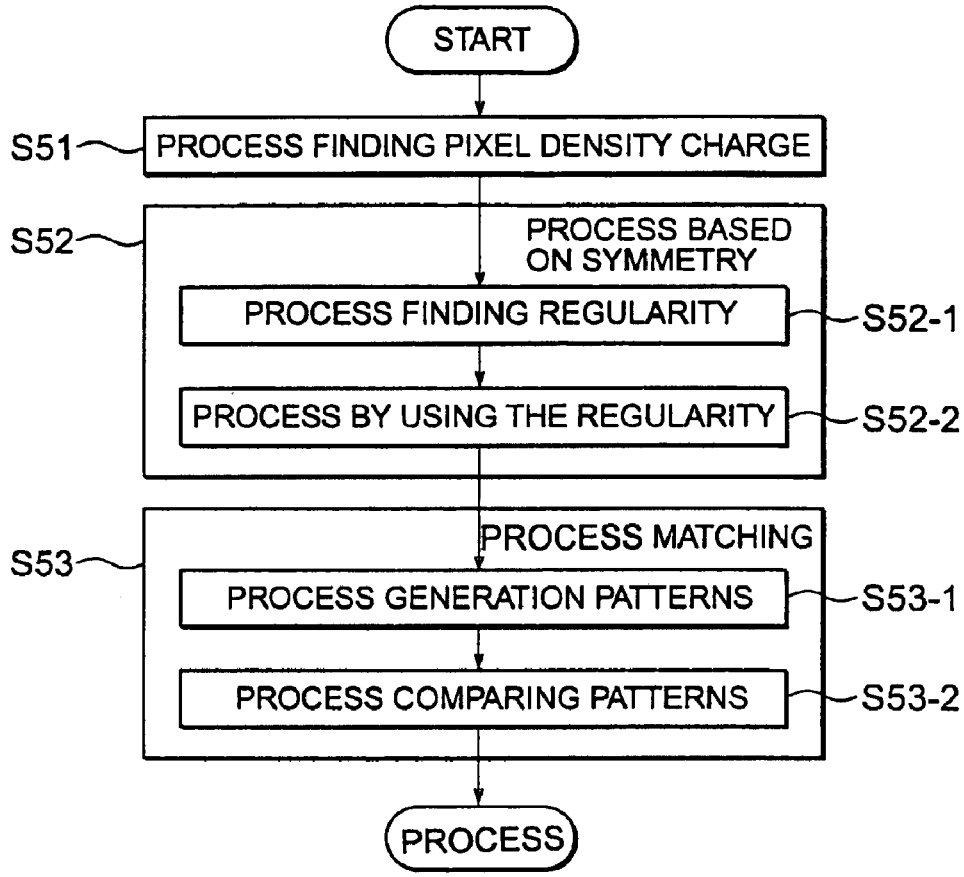
FIG. 14 shows a flow of the process deciding the round corner part of the present invention.

FIG. 14 shows a flow of the round corner deciding process implemented by the round corner deciding device 5. The process shown in FIG. 14 corresponds to the step S5 in FIG. 4, and is a feature process in the present invention. The round corner deciding process comprises a pixel density change process, a symmetry process and matching process.

At first, as the first process, the pixel density change finding process which decides the shape of a round corner based on the pixel density change of a corner of the extracted cell is implemented (step S51). That is, the pixel density change finding process is a process that decides a round corner by using the pixel density change, noticing to a corner of a cell. That is, the pixel density change finding process is a process mode deciding a round corner part based on the shape of corner of a sheet. A round corner can be decided even if the round corner has the unclearness. Now, (Pixel density)=(the total black pixel number in an object region)/ (the total pixel number in an object region). In step S31, the black pixel is a pixel which comprises a line extracted as the Y element or T element.

Figure 15A:
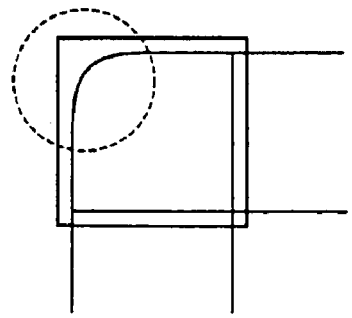
FIG. 15(A) and FIG. 15(B) show an explanation of the process finding the change of the present invention.
Figure 15B:
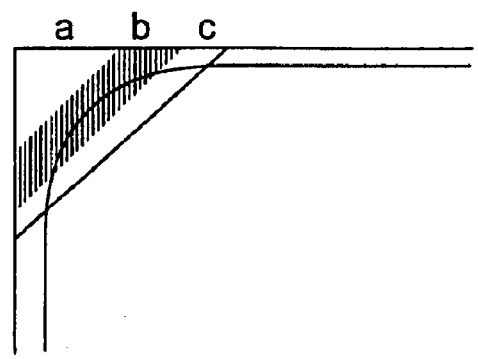

FIG. 15(A) and FIG. 15(B) show an example of the corner. FIG. 15(B) shows the enlarged corner of FIG. 15(A). As shown in FIGS. 15(A), 15(B), a low triangle region a, a high trapezoid region (a slashed region) b, low trapezoid region c are arranged in this order at a cell corner. That is the pixel density changes "low→high→low" in this order. At the angle part formed by two extracted lines comprising a cell, in case that the pixel density changes in this order to the direction separating from the vertex, the identified part is decided as a round corner. The round corner may be decided by using the feature of the pixel change in order of "low→high→low" even in case of the existence of the unclearness.

A threshold for finding the high or low of the pixel density is decided (or parameter) is set by a user at the input time of the sheet (the input image). When the user input does not executed, it is fixed by a predetermined value. Found by FIGS. 15(A) and (B), the pixel density of the region a is very low (in this example "0"). So the threshold of the region a is set very low, when the pixel density level is lower than the threshold, the pixel density is decided as low. The density level of the region b is a fixed level, the level is known precisely in considerable degree by experience. So the threshold of the region b is set less than the level, and when the density level is more than the threshold, the pixel density is found high. The pixel density of c is higher than the region a and pretty lower than region b. The pixel density is known considerably by experience. Therefore the threshold of the region c is set higher than that of a and much less than that of b, and the pixel density is found low, when the pixel density is less than the threshold.

In the pixel density process, the region for calculating the pixel density is set by a standard of a mean size of the oblique element calculated and extracted as the potential match of the round corner region by the potential match of the round corner finding device 3. For example, the value which is grater in a fixed rate than the mean value is set as the lower side of the value of the trapezoid region. By this, the region for the pixel density change finding process is minimized, so that the time for the pixel density change finding process is shortened. The lower side of the trapezoid region c is crossed 45° to a longitudinal and lateral line forming the rectangle region as shown in FIG. 15 (A) and (B). The upper side and lower side of the trapezoid region b is same.

By the way, at the pixel density finding process, when the pixel density of the triangle region a containing a vertex formed by two lines forming a cell is less than the threshold, the corner may be decided as round corner. Or, when the density of the region a is much less than the pixel density of region b (or when there is a difference between them), the corner may be found as the round corner. Or, when the pixel density change of the region a, the region b and the region c change "low→high→low", the corner may be decided as the round corner.

Figure 20:
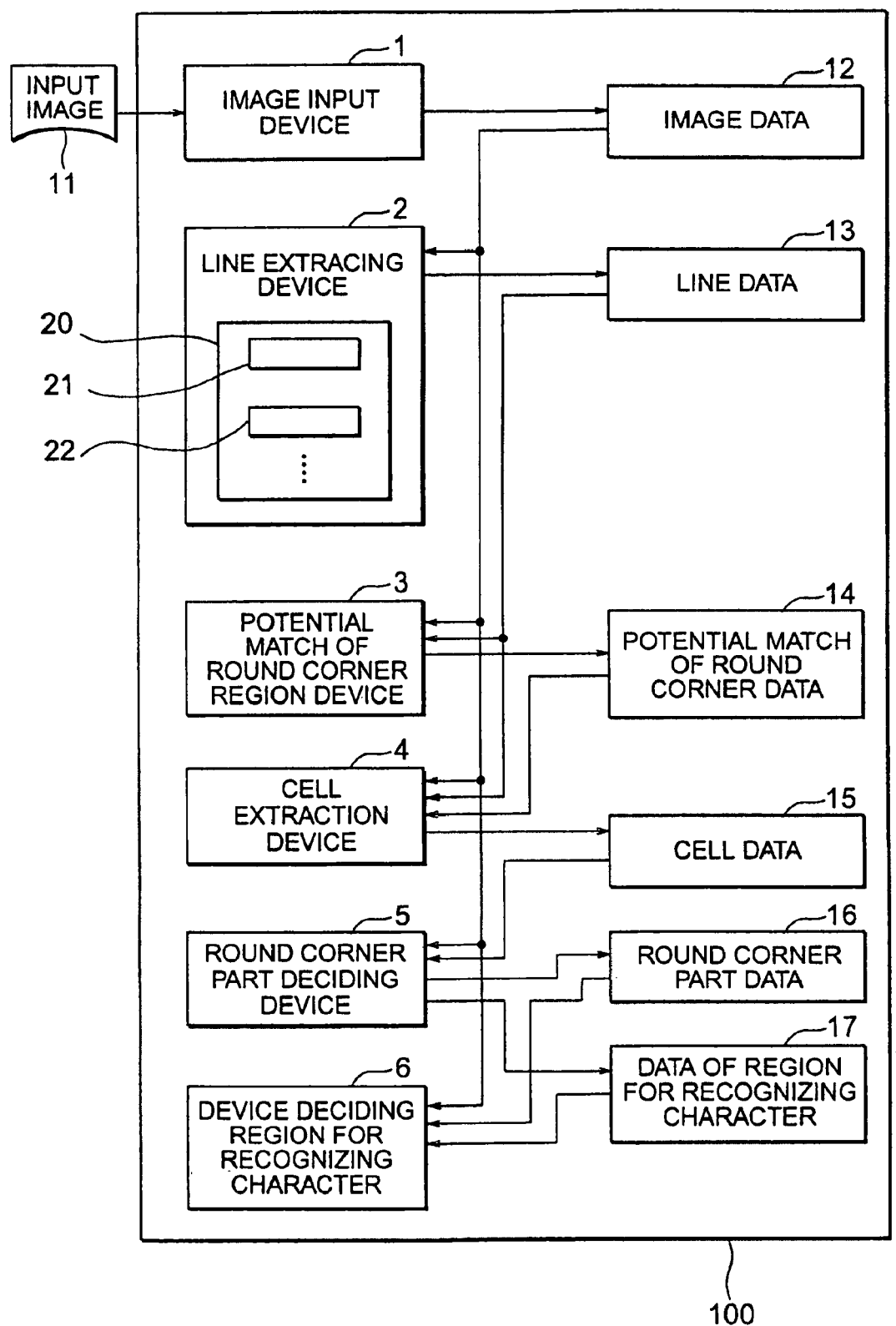
FIG. 20 shows components of the table image processing the device of the present invention.

After the process, as the second process, the symmetry process is implemented (step S52). The input image data 12 of FIG. 20 is not always good. That is, all round part is not extracted exactly always by the pixel density change finding process, because of the existence of the unclearness or crush of the ruled line, the contact of characters to the ruled line etc. When the regularity of an object table structure for extracting the round corner is found in advance, the round corner is extracted by high exactitude extraction of the round corner based on the regularity.

Figure 16A:
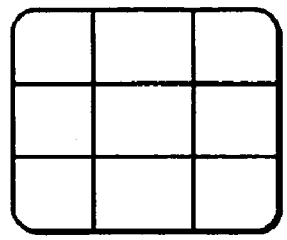
FIG. 16(A) and FIG. 16(B) show explanations of the symmetry process of the present invention.
Figure 16B:
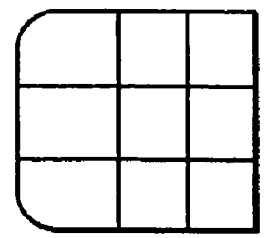

The symmetry process is a process which decides a round corner by identifying the regularity of the table form of a sheet and the regularity of the repeat of same table form of the corner (the direction of round corner is different). On many sheet used generally, all corners of outer line are round corners as in FIG. 16(A). On the contrary, all of the corners are not round at all, as shown in FIG. 16(B). A sheet of which a part of corners is round does not exist almost. So a round corner can be extracted with high accuracy by using the symmetry of the corner.

At first it is investigated whether the regularity is defined or not as a forgoing step (step S52-1). For example it is input at inputting time of the sheet (input image 11 of FIG. 20) by user that the sheet has the regularity of table form.

After the process, the process using the regularity (the symmetry) is implemented, in a case that the sheet having the regularity shown in FIG. 16 (A) is directed. That is, for example, when a corner of four corners of the sheet is decided as a round corner by the above mentioned pixel density change finding process, it is considered that the possibility for round corner of the other three corners is high. Next for the three corners, losing the restriction for finding pixel of the pixel density finding process, and implementing the pixel density change finding process again, the result is decided as a final result. Accordingly, the symmetry process is, in fact, repeat of the pixel density change finding process with the relaxed condition. The relaxation of the condition is executed by changing the threshold (or a parameter).

For example, when a character is written so as to cross the round corner c as shown in FIGS. 15(A) and 15 (B), the pixel densities of the region a and the region c are greater than the threshold of the region a and the region. In the case, the pixel density concerning to the region a, b and c decide high, so that the change is not caused. On the other case, when a character is written extremely close to the round corner region, the region c of the pixel density is greater than the threshold. In the case, the pixel density of the region a, the region b and the region c are "low→high→high" in that order. Accordingly, the threshold of the region a and the region c are changed to a high value for the range of predetermined value. So the pixel density of the range a, the range b and the range c changes "low→high→low". As the result, the condition of the round corner deciding part is relaxed, so that the round corner, which is not decided as the round corner at the first step, is decided as a round corner.

Even if the regularity is directed, when the round corner of a fixed number is not decided, the symmetry process is not implemented (step S52-2). Because, in the case, it is considered that all the corner have not the round corner at all. The number of the round corner which directs commencing the symmetry process is set in advance. The number is usually one, but more than two is allowable, for example, it is input by user at the initial input time of the input image 11 of FIG. 20.

Or plural times of implementation of the symmetry process (step S52-2) are allowable. That is, when the round corner is not decided, even if the threshold of the region a and the region c are changed great in the fixed range, further the threshold of the region a and the region c are changed again great in the fixed value, the process is repeated. By the process, the round corner is decided certainly, even if the character contacts with the round corner.

As mentioned above, in addition to the process mode deciding the round corner using the form of corner of a sheet, by using the process mode deciding the round corner using the symmetry of the corner of the outer line of a sheet, the round corner or not is decided to every corner. By the process, when the regularity of the sheet is found in advance, the round corner is decided with high accuracy. That is, when, in the pixel density change finding process, more round corners than a fixed value are found, in the symmetry process after the process, the pixel density change finding process is implemented again for a corner which is not decided as a round corner in the pixel density change finding process. By the process, the round corner is decided accurately.

By the way, when the regularity is not found in step S52-1, the step S52-2 is neglected. That is, only the round corner extracted by the pixel density change finding process is decided as the round corner part. In the case, the table structure of which a part of the corner of the outline is the round corner is found.

Further, the direction of the input that the sheet has regularity may be a position or number of the corner having regularity, and any number of corner of the regularity in the direction is allowable.

After the process, matching process is implemented as a third process (step S53). The pixel density change finding process and the symmetry process are not adaptive for a dotted line of which the point space is wide. This is for the reason that the pixel density change cannot be extracted exactly because of existence of the space between the dots. Therefore, a matching process is implemented for a corner which is not decided as a round corner by the pixel density change finding process (or both of the pixel density change finding process and the symmetry). The matching process is a process recognizing a corner by finding a match of a generated pattern with an image pattern (or an approximated pattern). By the matching process, the round corner may be decided for the dotted line of which space between dots is wide.

Figure 17A:
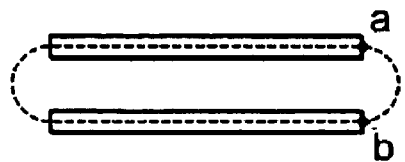
FIGS. 17(A),17(B),17(C) and 17(D) show explanations of the process matching of the present invention.
Figure 17C:

The matching process is implemented, as shown in FIGS. 17(A), 17 (B), 17(C) and 17(D), when the distance between two lateral lines (same as the two longitudinal lines) or the distance between the longitudinal line and the lateral line are less than a fixed value. FIG. 17(A) and FIG. 17(C) correspond each others. FIG. 17(B) and FIG. 17(D) correspond each others. When the matching process is implemented only in case of the distance less than a fixed value, the implementing matching process are a few times, so that the process is implemented with high efficiency.

Figure 17B:
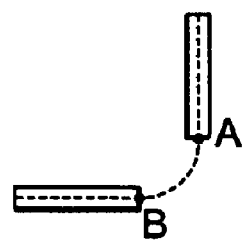
Figure 17D:
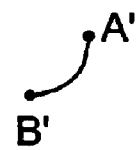

In the matching process, at first a pattern connecting terminals of the two lines each other is generated (step S53-1). That is, the pattern for using the matching process is not prepared in advance, but generated at each necessary occasion. Storing many patterns in memory is not necessary, and a great size memory is not necessary, therefore. The $n^{th}$ order multi terms function, such as $f(x)=a_0x^n + a_1x^{n-1} + \ldots + a_n$, used for generating the pattern. For example, FIG. 17(A) shows a situation that the terminals of the two lateral lines (or two longitudinal lines) are close each other. In the case, a pattern a' b' for the terminal a, b of the two lateral lines is generated (refer to FIG. 17(C)). The pattern a' b' is a half circle. The situation shown in FIG. 17(B) is an example that the terminal A of the longitudinal line and the terminal B of the lateral line are close each other. In the case, patterns A'B' are generated corresponding to a terminal of the longitudinal line A and the terminal of the lateral line B (refer to FIG. 17(D)). The generated pattern A'B' is a circular arc of 90°. When the generated pattern a' b' or A'B' is matched with the image pattern, the corner is decided as a round corner.

Next the generated pattern and the image pattern of the input image data 12 of FIG. 20 (the input pattern) are compared (step S53-2). As the result, when the pattern is matched, the corner is decided as a round corner of which form is same pattern as the generated pattern. By the process, the round corner is found exactly, even if the line as the solid line having unclearness or a dotted line of wide space between the dots.

By the way, it is possible to generate a pattern approximated to an image pattern (an approximated pattern), and to compare the approximated pattern to the input pattern. The approximated pattern is obtained by approximating the image pattern with a rectangle. By using the approximated pattern, the round corner is found precisely, even the input pattern of a solid line having unclearness and a dotted line of wide space between the dots.

As mentioned above, the matching process is implemented only when the round corner cannot be found by the pixel density finding process and the symmetry process. Even if the process in the mode deciding the round corner part based on the form of the corner (or the regularity of the corner) cannot decide the round corner (for example, dotted line), the round corner is decided by the matching process. Additionally, as the pattern generation times is reduced in the present invention, the process is implemented with high efficiency.

As the result, a round corner part of a sheet is extracted from the image data 12 of FIG. 20 as shown FIG. 18. This is the round corner part data 16 of FIG. 20.

FIG. 18 shows a character recognition region deciding process implemented by the character recognition region deciding device 6. The process is the step S6 of FIG. 4, and a well known process.

FIG. 18 shows a relation of the round corner and the cell C1 in case of a corner decided as a round corner in the round corner part deciding process. As shown FIG. 18, the decided round corner part is contained in the cell C1. Now, "a b c" are letters written in the sheet. Next the character recognition region deciding device 6 decides the rectangle region shown by the dotted line just inside the cell region C2 as a temporally character recognition region C2. After the process, the character recognition region deciding device 6 decides the true character recognition region by eliminating a region (a triangle region of oblique line) C3 on which the round corner exists from the temporary character recognition region C2. By the process, it is prevented that the round corner is recognized as a letter, so that the exact recognition of the letters "a b c" are executed.

In the above description, the present invention is explained by an implementing mode, but various modification is possible in view of the present invention.

For example, it is not necessary for the table image processing device 100 to provide all the components described above mentioned, the device composed of simple components is allowable, if need arises. Especially, as the line extracting device 2, the potential match of the round corner finding device 2, the cell extraction device 4, the round corner part deciding device 5 and the character recognition region deciding device 6 are realized by software, a CPU load is great and a great size memory is also necessary. Therefore the component of each device may be simplified. In the case, the extraction accuracy of the round corner is decreased, but the process speed becomes speedy.

As an example, in the potential match finding process of the potential match of the round corner region finding process, only the overlap process is implemented (step S32-1), and only the pixel density change finding process (step S51) is implemented as the round corner deciding process. In the case, as only the overlap process is implemented, a pair of a longitudinal line and lateral line set within a fixed distance (the example shown in FIG. 9) is decided as a process object of the round corner.

As another example, only the near process (step S320-2), or only the detecting process (step S32-3P) instead of the overlap process (step S32-1), or any two process selected from the three steps are composed as the potential match finding process in the potential match of round corner region finding process. Or as another example, only the image density change finding process (step S51) is implemented as the round corner part deciding process. Or, for the near process, only the example shown in FIG. 10 is treated as the processing object of the round corner part, and for the detecting process, only the example shown in FIG. 11 is treated as the processing object of round corner part.

On the contrary, in the above mentioned example, as an example, the pixel density change finding process and symmetry process (step S52), or the pixel density change process and matching process (step S53) are composed in stead of the pixel density change finding process (step S51) as the round corner finding process. Or as the potential match finding process, the overlap process is composed.

As shown in the above mentioned explanation, the potential match finding process and the round corner part finding process is chosen from any process of the above mentioned plural process, and implemented. Accordingly, these processes are composed of other many combination other than the above mentioned example.

Additionally, as another example, only the potential match of the round corner region and only the round corner part deciding device include of the components explained in the embodiment, and for each other each device, the well known device other than the device explained in the above mentioned device. In this case, the potential match of the round corner region finding device 3 and the round corner deciding device 5 may include simplified components.

Further in the process flow shown in FIG. 4, the order of process may be changed variously. That is, after the line extraction process (step S2), without the potential math of the round corner region finding process (step S3), the cell extraction process (step S4) is implemented before to decide the cell form, after the process, the potential match of the round corner region finding process (step S3) and the round corner deciding process (step S5) are implemented in this order. On the contrary, after the line extracting process (step S2) and the potential match of round corner region finding process (step S3), without implementing the cell extracting process, the round corner finding process (step S5) is implemented to decide the round corner, after it, the cell extracting process (step S4) is implemented. Further, in addition to modifying the process order, the simplified components of the potential match of round corner region finding device 3 and the round corner deciding device 5 are used.

Additionally, for example, based on a result of the specified process, the order of the process shown in FIG. 4 is changed. That is, when the sizes (length of oblique line) of all oblique elements Y and the oblique element T extracted in step S31 are less than a fixed value, the potential match region finding process (step S32) and the line information forming process (step S33) are neglected, and the cell extracting process (step S4), the potential match of the round corner region finding process (step S3) except the step S31, the round corner deciding process (step S5) may be implemented in this order. Further, in the case, by neglecting the potential match finding process (step S32), the potential match of round corner region finding process (steep S3) can be neglected substantially. Even if the processes are implemented, because the area of the round corner part is small, augmentation of the load for implementing directly the round corner deciding process is avoided.

The Second Embodiment

FIG. 20 shows a component of the table image processing device, and an example of the table image process device 100 of the present invention, which corresponds to the table image processing device 100 shown in FIG. 2. The table image processing device 100 shown in FIG. 20 has fundamentally same components as the table image processing device shown in FIG. 3. It defers from only a point that the line extracting device 2 contains a unit processing finding a ruled line 20 additionally. The unit processing finding ruled line 20 finds whether the potential match of the ruled line is a real ruled line or not by finding the roughness of the potential match of the ruled line by using plural thresholds which are defers each other corresponding to the image pattern existing around the identified potential match of the ruled line extracted from the input image 11, concerning to the potential match of the ruled line of the longitudinal and lateral ruled line extracted from the input image 11 of FIG. 20 (or image data 12 of FIG. 20). As an example, two thresholds of a low first threshold 21 and a second high threshold 22 are used.

The table image processing device 100 shown in FIG. 20 processes fundamentally same process as the table image process device 100 in FIG. 3, and only a part of the formation process of the line data 13 of FIG. 20 (the extraction process of the potential match of the ruled line) in the line extracting device 2 differs from. In following, the explanation of the same process as the image processing device 100 is neglected, and the process in the line extracting device 2 is explained mainly.

Figure 21:
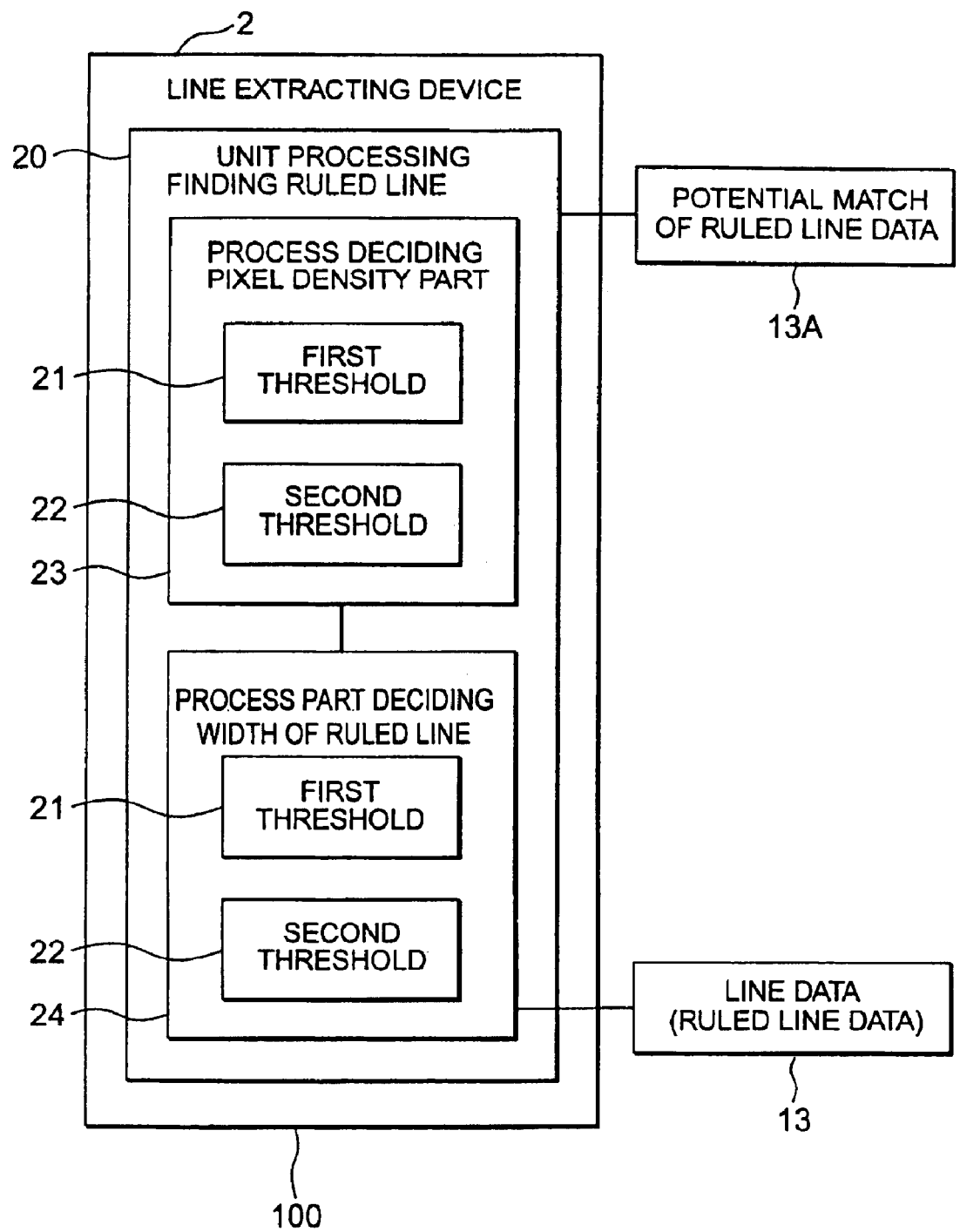
FIG. 21 shows components of the line extraction the device.

FIG. 21 shows components of the means for finding ruled line 20. As shown in FIG. 20 and FIG. 21, the unit for processing finding ruled line 20 is included in the line extracting device 2. The means for processing finding means 20 finds whether the potential match of the ruled line is ruled line or not for the potential match of the longitudinal and lateral line extracted from the line extracting device 20. Accordingly, the object of the line extracting device 2 is the data obtained by implementing processes from the process linking the pattern extracting process (step S21) to the dotted line extracting process (step S25) in the line extracting device 2 in the process shown in FIG. 5. The process from the linking pattern extracting process to the dotted line extracting process is realized any one of well known processes. The data is composed of the line and dotted line extracted by the above mentioned process, and they are called the potential match data 13A in the example. The means for processing finding ruled line 20 neglects the low potential match of the ruled line from the potential match of the ruled line 13A and makes line data, that is, the ruled line data.

As the unit for processing finding the ruled line 20 is a part of the line extracting device, it is realized by a program which exists in a memory of the line extracting device 2, and implements the process by the execution in a CPU. The ruled line finding process program is a part of the line extracting process program. In the process implemented by the line extracting device 2, the process of the means for processing finding the ruled line is a specific process of the present invention, but another processes (from the linking pattern extracting process to the dotted line extracting means) are well know processes.

Now, in the table image processing device 100 shown in FIG. 3, after implementing the process from the linking pattern extracting process (step S21) to the dotted line extracting process (step S25), the ruled line finding process neglecting the low possibility of the potential match of the ruled line region obtained as the result of the processes from the potential match of the ruled line. The ruled line is implemented by, for example, a technique described in Japanese Laid Open Patent Application 334185/10. According to the technique, a line (ruled line) finding process by detecting the pixel and the degree of roughness is implemented. That is, a pixel detecting process is implemented for the extracted potential match of the ruled line, and the roughness is calculated. When the roughness is more than a fixed line (threshold), the image pattern is decided as a pattern other than a ruled line (that is, a letter), and when the roughness is less than the threshold, the image pattern is decided as a ruled line. As the technique is above mentioned, the explanation is neglected.

As shown in FIG. 21, the unit for processing finding the ruled line 20 includes a pixel density finding process part 23 and a ruled line width finding process part 24. The pixel density finding process part 23 and the ruled line width finding process part 24 have a first threshold 21 and a second threshold 22 (threshold of roughness) each in advance for finding process. The process of the first threshold of the pixel density finding process part 23 and that of the ruled line width finding process part 24 are different process, so that the first threshold of the pixel density finding process part 23 and that of the ruled line width finding process part 24 are not same, but they are not distinguished in the explanation. This is same in the second threshold. The first threshold means a low threshold and the second threshold means a high threshold. The first threshold 21 and the second threshold 22 of the pixel density finding process part 23 and the ruled line width finding process part 24 are set in advance for an appropriate value according to each implementing process. These values are sets by the appropriate value by experience (or statistically, by experiment).

In the ruled line finding process unit 20, any one of the pixel density finding process part 23 and the ruled line width finding process part 24 can be implemented before, in processing a given potential match of ruled line 13A. In both cases, a low potential match of ruled line is neglected within the potential match of the ruled line. The means for processing finding ruled lines 20 may include one of the pixel density finding process part 23 and the ruled line width finding process part 24. The means for processing finding ruled line 20 is realized by software, so that the CPU load is great and a great size memory is necessary. Accordingly, only one of them is composed to make the device briefly, as an example. In this case, the extracting accuracy of ruled line is lowered, but the process speed is raised.

The pixel density finding process part 23 finds whether the potential match of the ruled line is a real ruled line or not base on the roughness of the potential match of the ruled line found by using the predetermined first threshold 21 or the second threshold 22 which is higher than the first threshold. The first threshold 21 is lower than the second threshold 22. The pixel density finding process 23 choices the first threshold or the second threshold corresponding to the pixel density of a different image pattern existing around the identified potential match of the ruled line, the first threshold 21 is used in case of the pixel density of the image pattern is high, and the second threshold 22 is used in case of the pixel density of the image pattern is low.

When the potential match of the ruled line is a longitudinal ruled line, the pixel density finding process 23 in the means for processing finding the ruled line 20, uses the image pattern of the ruled line existing within a fixed right and left range of the identified longitudinal potential match of the ruled line and the length of the potential match of the ruled line is same length as the identified potential match of the ruled line, as the different image pattern existing around the identified potential match of ruled. When the potential match of the ruled line is a lateral ruled line, the pixel density finding process 23 in the means for processing finding ruled line 20, uses the image pattern of the ruled line existing within a fixed right and left range of the identified lateral potential match of the ruled line and the length of the potential match of the ruled line is same length as the identified potential match of the ruled line, as the different image pattern existing around the identified potential match of ruled. That is, the pixel density of the region decided by the process is used for finding the ruled line. When real image pattern does not exist in the region, the pixel density is "0.

The ruled line width finding process part 24 finds whether the potential match is the ruled line or not by the roughness of the potential match by using one of the thresholds of the first thresholds or the second thresholds higher than the firs. The first threshold 21 is lower than the second threshold 22. The ruled line width finding part 24 choices the threshold corresponding to the width of the different image pattern existing around the identified potential match of the ruled line, concretely uses the first threshold, when the width of the different image pattern is wide, and uses the second threshold, when the different image pattern is narrow.

The ruled line width finding process part 24 of the means for processing finding ruled line 20 uses the differential potential match of the ruled line extending to same direction as the potential match of the ruled line and adjacent or linked to the identified potential match of the ruled line, as the different image pattern. That is, a potential match of the ruled line composing the same ruled line as the identified potential match of ruled line is used as the different image pattern existing around the identified potential match of ruled line.

The ruled line width finding process part 24 decides that the width of the identified potential match of the ruled line is wide in case that the width of the potential match of the ruled line is more n times than that of the different image pattern existing around the identified potential match of the ruled line, and the width of the potential match of the ruled line is narrow in case that the width of the potential match of the ruled line is less 1/n times than that of the different image patters. Now n is a positive integer, for example it is "3".

Figure 22:
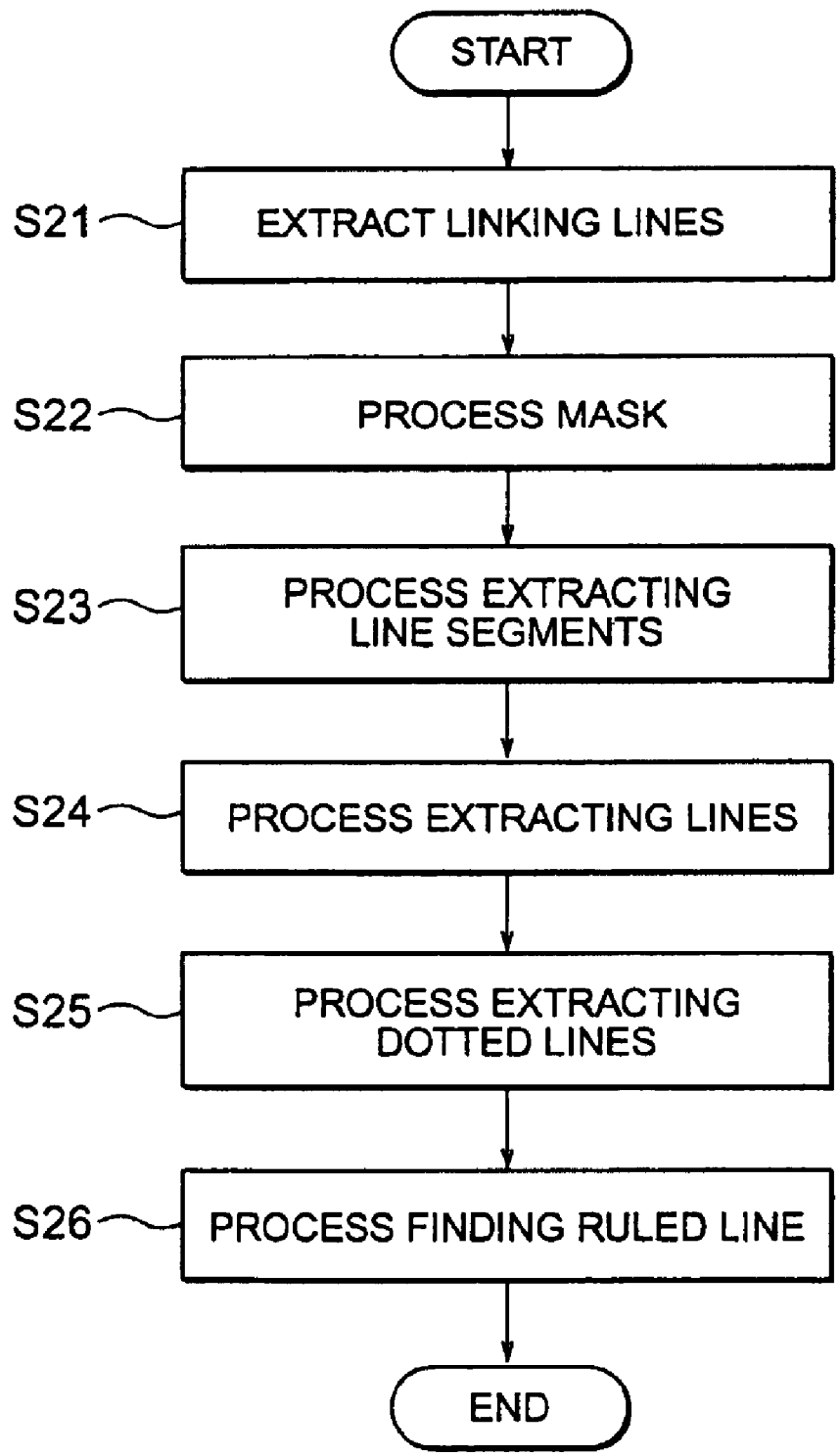
FIG. 22 shows a flow of the process extracting lines of the present invention.

FIG. 22 shows a flow of the line extraction process implemented by the line extracting device 2. The process shown in FIG. 22 is fundamentally same as the process shown in FIG. 5, but it defers from only a point that the ruled line finding process (step S26) is implemented after the dotted line extracting process (step S25). Therefore, an explanation of the same process as shown in FIG. 5 is neglected, the ruled line finding process (step S26) is only explained.

At first the line extracting device 2 implements the linking pattern extracting process (step S21) to the dotted line extracting process (step S25) like shown in FIG. 5. As the result, lines and dotted lines approximated by the rectangle shown right in FIG. 7 are extracted from the image data 12. These are the potential match of the ruled line data 13A.

The line extracting device 2 implements the ruled line finding process by the means for processing finding the ruled line 20 as shown FIG. 13A, and extracts the line data (rule line data) 13 from the potential match data 13A (step S26)

Figure 23:
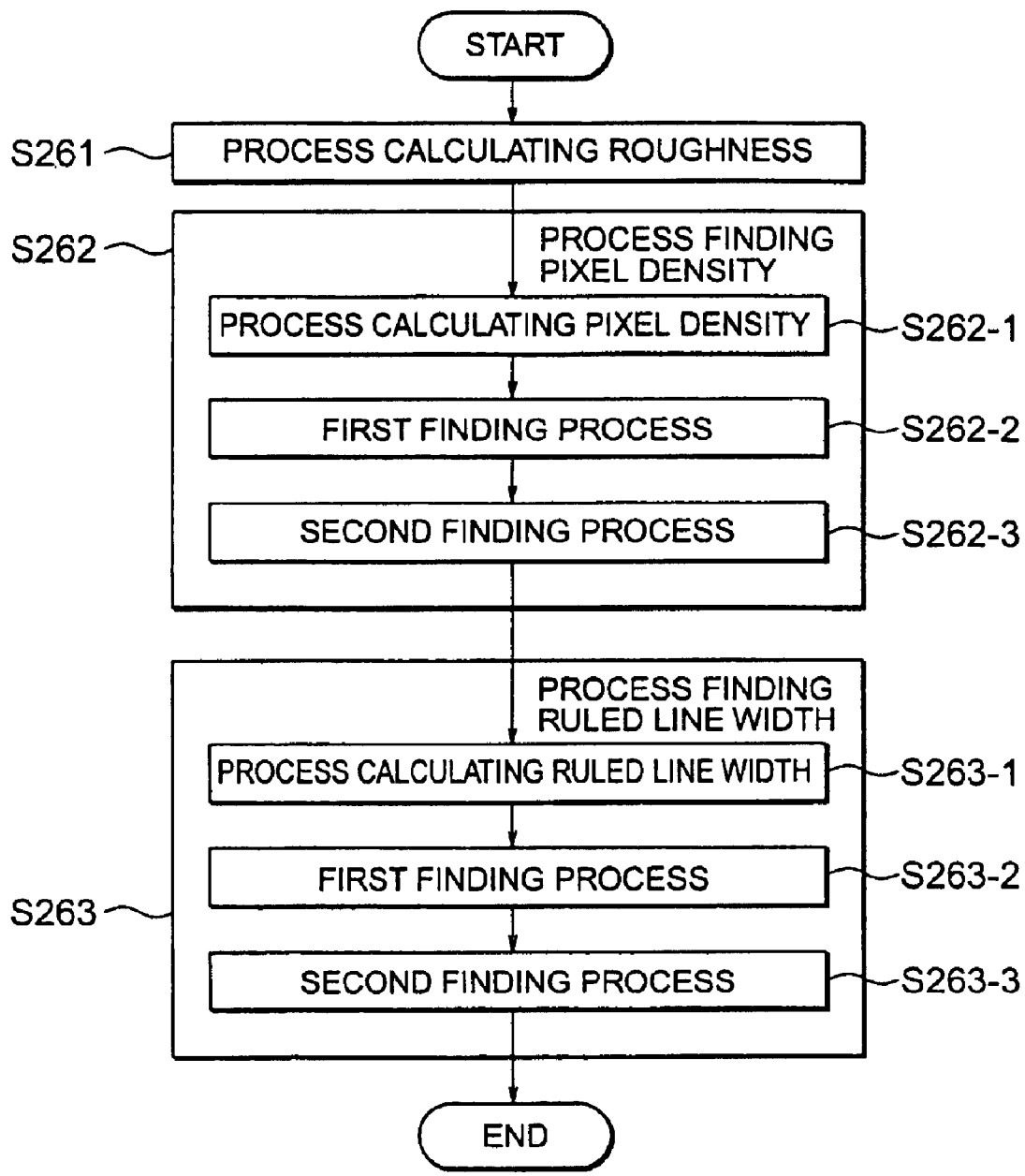
FIG. 23 shows a flow of the process finding the potential match of the ruled line of the present invention.

FIG. 23 shows a flow of the ruled line finding process implemented by the means for processing finding the ruled line 20. The ruled line finding process includes a pixel density finding process in the pixel density finding process part 23, and a ruled line width finding process in the ruled line width finding process part 24. The pixel density finding process is explained by referring the FIG. 25, and the ruled line finding process is explained by referring FIG. 26.

At first the roughness calculating process is implemented by the means for processing finding the ruled line 20 as a previous process (step S261). The roughness calculating process is implemented by using a well known line detecting process. For example, a technique described in Japanese Laid Open Patent Application 334185/10 proposed by the applicant of the present invention is used as the well known line detecting process. The pixel detection is executed by the technique.

The well known technique is explained as the "line detecting process", now the pixel detection is explained only. At first, pixels (black pixels input as the pattern) are detected in a direction (a longitudinal or lateral direction) of the image pattern of the investigated object in the potential match of the ruled line. Further the detection continues as long as the pixel exists in the detecting direction. In the process, the detecting direction does not change. On the other hand, only when the pixel does not exist in the detecting direction, pixels existing in the oblique direction is detected. In this case, the detecting direction is changed. The change times of the detecting direction is counted. The counted change times are the roughness of the potential match of the ruled line. When the pattern is a ruled line, the change times of the detecting direction are small, because of the implementation in same direction, and when being a pattern (letter) other than ruled line (character), it is great.

Next, as a first step, the pixel density finding process 23 (step S262) is implemented.

Figure 24A:
FIG. 24(A), FIG. 24(B), FIG. 24(C) and FIG. 24(D), show examples finding the roughness by the prior art and the of the present invention.
Figure 24B:
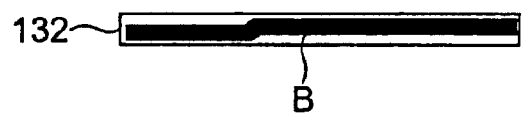
Figure 24C:
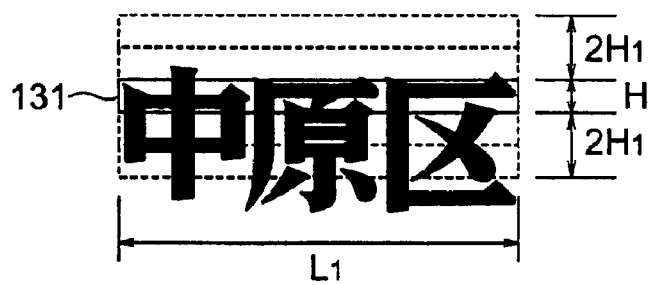
Figure 24D:
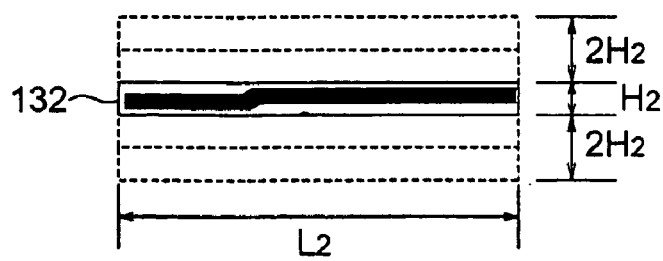

In the pixel density finding process, the pixel density is calculated (step S262-1). The different image pattern existing around a identified ruled line to be used in the pixel density finding process is decided as following. For example, as the potential match shown in FIG. 24(A) is a lateral ruled line, the different pattern is decided as show in FIG. 24(C). That is, the different pattern is a pattern of same length L1 as the identified lateral ruled line, and existing within the width of 2H1 (or more than 3H1 is possible) upper and under the notice lateral ruled line. Now, H1 is a width (height) of the identified lateral line. Accordingly, the two range upper and under the region of L1×2H1 are used for the pixel density finding. The different image pattern corresponding to the image pattern of a identified potential match of the ruled line shown in FIG. 24(B) is decided as shown in FIG. 24(D). That is, patterns of same length L2 as the identified lateral potential match of the ruled line, and existing within the width 2H2 or more 3×H2 upper and under the identified lateral potential match of the ruled line are used as the different image pattern. Now, H1 is a height of the lateral line (height). Accordingly, the two ranges upper and under the region of L2×2H2 are used for pixel density finding.

By the way, when the identified potential match of the ruled line is even the longitudinal ruled line, the image density finding process part 23 decides the region for finding the pixel density by the same way. That is, within the input image, an image pattern of the same length as the identified longitudinal ruled line and existing within a fixed range upper and under the identified longitudinal ruled line is used as the different image pattern.

As understood from the upper explanation, the size of the range used for the pixel density finding is varies (proportional) corresponding to the length and the width of the identified potential match of the ruled line. The reason why the different image pattern depends on the length of the identified potential match of ruled line is, because the rest of the letter exists always in the region as shown in FIG. 24(C). Also, the reason why the difference image pattern depends on the width of the identified potential match of the ruled line is, because the identified potential match of the ruled line is decided surely as a ruled line, even if there are unclearness in the plural width of the ruled line (for example, a fine line of 1 dot, a usual line of 5 dots and a gross line of 10 dots).

The pixel density, of which the region is decided like this, is calculated. A well known pixel projection process is used for calculating the pixel density. Or same process as the pixel density change finding process (step S51) shown in FIG. 14 is used. That is, (the pixel density)=(the total number of black pixel in the region)/(the total number of the pixel in the region). The black pixel is pixel which composes the different image pattern existing around the identified potential match of the ruled line. Number of the black pixels and total number of the pixel in the region are counted.

In the case of FIG. 24(C), the pixel density of the upper region of L1×2 H1 is low, but the pixel density of the under region of L1×2H1 is very high. In the case, when only the pixel density of the upper region is used, any exact result (the pixel density of around region is high) cannot be obtained. Therefore, the mean value of the pixel density of two regions of L2×2H2 of the upper region and the under region is used for finding the pixel density. As the result, in the case of FIG. 24(C), the pixel density of the two regions of L1×2H1 becomes higher. In the case of FIG. 24(D), both pixel densities of two regions of the upper side and under side of L 2×2H2 is very low, the mean value is also very low.

The threshold for finding the high or low of the pixel density is set in advance in the pixel density finding process part 23 independent to the threshold for finding the roughness. The threshold is set to an appropriate value by experience (or statistically or by expedience). In the case shown in FIG. 24 (C), the pixel density of the two regions of L1×2H1 is decided high. In the case shown in FIG. 24(D), the pixel density of the two regions of L1×2H1 is decided low.

Next based on the result of the decision of the pixel density, the first finding process is implemented (step S262-2). The object of the process is a case shown in FIG. 24(A) or 24(C) that is the pixel density of the different image pattern existing around the identified potential match of the ruled line.

The potential match of the ruled line shown in FIG. 24(A) is a part of the line section of character in itself. Accordingly, there are the another part of the character A at the line section around the potential match of the ruled line, as mentioned above, the pixel density of the different image pattern around the identified potential match of ruled line is high. As the around pixel density is high, the possibility for character of the potential match of the ruled line is high. It is necessary that the potential match of the ruled line which is very low roughness (that is, smooth) is left, therefore. Accordingly, the first threshold 21 of a low value is used. The roughness of the line section of the character A extracted as a potential match of the ruled line is high in itself, but it is decide as fairly low. When the second threshold 22 of high value is used, as the roughness of the line segment of the character A is less than the second threshold 22, it is decided as a ruled line. In the case, by using the first threshold 21, the roughness of the line section of the character A is more than the threshold 21, it is neglected from the potential match of the ruled line data 13A.

It is not desirable that the first threshold 21 is too low. For example, in case that a character over laps on a ruled line, the pixel density of the different image pattern around the identified potential match of the ruled line becomes high. But the potential match of the ruled line, which is different from a case of FIG. 24(A), should be left as a ruled line in view of a point extracting all ruled lines without omission. By the way, the first threshold 21 is set higher than the roughness of the case that a character is overlap on a ruled line, and less than the roughness of the potential match of the ruled line composed of only a character. Because of the fact, a ruled line which overlaps with a character is found as a ruled line and left in the potential match of the ruled line data 13A.

Next, the second finding process is by using the second threshold (step S262-3) based on the result of the pixel density. The object of the process is a case of FIGS. 24(B) or 24(D) being the different pattern around the identified potential math of the ruled line and decided as low pixel density. By the way, it is allowed whichever the second process and the first finding process (step S262-2) is implemented first.

The potential match of the ruled line shown in FIG. 24(B) is a part of line B in itself. As mentioned above, the different image pattern existing around the identified potential match of ruled line is low, because of a low possibility of existence of the another part of the ruled line B. As the peripheral pixel density is low, the possibility of the identified potential match of the ruled line is high. Accordingly, it is necessary that even the potential math of the ruled line having considerable high roughness (that is, there are some ruggedness) should be left as the ruled line. Therefore the second threshold 22 having higher value is used. The line B extracted as the potential match of the ruled line is high, but it is low in itself. Accordingly, when the first threshold 21 is chosen, the roughness of the line B is more than the first threshold 21. As the result, it happens that the line B is not decided incorrectly as a ruled line. By using the second threshold 22, the roughness of the segment line of character A is less than the second threshold 22, so that the line b is decided as a ruled line. That is, the ruled line is left in the potential of the ruled line data 13A.

Accordingly, within the segment line of the character A, which are extracted as the potential match of the ruled line for the reason of the an inappropriate input image 11, and the ruled line B having same low roughness, one (a segment line of character A) can be neglected from the potential match of the ruled line data 13A, and another (the line B) can be left in the potential match of the ruled line data 13A. As mentioned above, the table image processing device of the present invention implements the finding process of ruled line by the roughness, so that the potential match of the ruled line is exactly found, even if there is disturbance of a line part of the letter and a line of the ruled line.

Next, as a second process, a process for finding the ruled line width is implemented by the ruled line width finding process part 24.

Figure 25A:
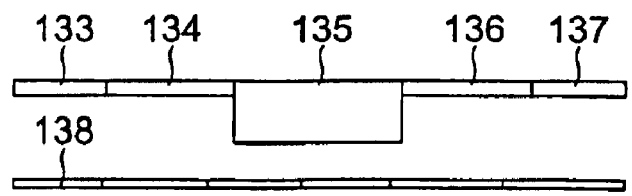
FIG. 25(A), FIG. 25(B), FIG. 25(C) and FIG. 25(D) show another example finding the roughness by the prior art and the of the present invention.
Figure 25B:
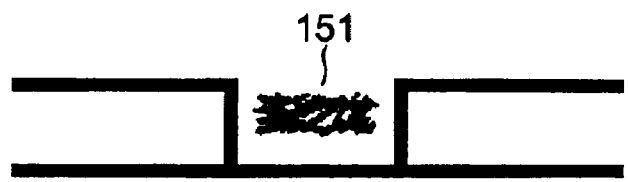
Figure 25C:
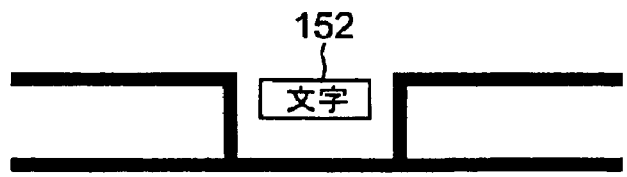
Figure 25D:
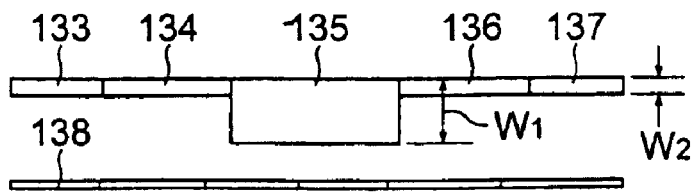
Figure 26A:
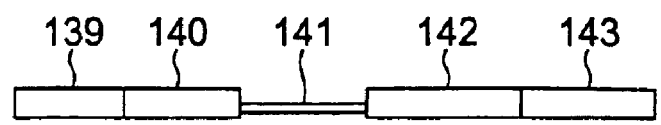
FIG. 26(A), FIG. 26(B), FIG. 26(C) and FIG. 26(D) show another example finding the roughness by the prior art and the of the present invention.
Figure 26B:
Figure 26C:
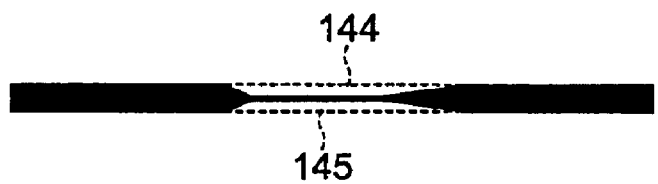
Figure 26D:
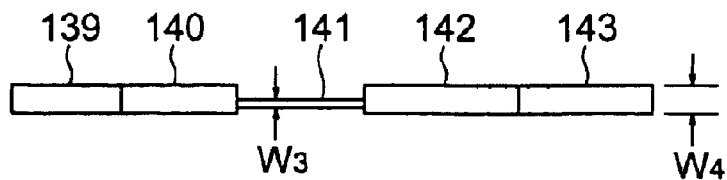

In the ruled line width finding process, at first, the ruled line width is calculated (step S263-1). The different image pattern around the identified potential match of the ruled line used in the rule line width finding process is found as following. For example, the different image pattern concerning to the identified potential match of the ruled line 135 shown in FIG. 25(A) is the potential match of the ruled line 134 and 136 extending to the same direction as the identified potential math of ruled line 135 and adjacent to the potential math of the ruled line 135, or the ruled line 133, 134, 136 and 137 connected to the potential match of the ruled line. The potential match of the ruled line 138 etc. independent entirely from the potential match of the ruled line 135 is not considered at all. Similarly, the different image pattern concerning to the identified potential match of the ruled line 141 shown in FIG. 26(A) is the potential match of the ruled line 140 and 142 extending to the same direction as the identified potential math of the ruled line 141 and adjacent to the identified potential math of the ruled line 141, and the potential match of the ruled line 139, 140, 142 and 143 connected to the identified potential match of the ruled line 141.

The ruled line width for the potential match of the ruled line decided like this is calculated. The ruled line width is calculated by counting the pixel number of the long side and short side of rectangular region of the potential match of the ruled line, and by choosing the less value (short side, that is, the width). By the process, the width W1 of the potential match of the ruled line 125 shown in FIG. (25)A, and the width W3 of the potential match of the ruled line 135 shown in FIG. (26)A.

As mentioned above, there are usually plural potential matches of the ruled line used as the different image pattern. In this case, each width of the potential matches of the ruled line is obtained, and calculate mean value of them, and the mean value is used as a width of the potential match of the ruled line of the different image pattern existing around the identified potential match of the ruled line. In the case of the potential match of the ruled line 135 shown in FIG. 25(A), the mean value of the ruled line width of the potential match of the ruled line 130,134,136 and 137. The value is referred to W2 shown in FIG. 25(D). In the case of the identified potential match of the ruled line 141 shown in FIG. 26(A), the value of the ruled line width of the different potential matches of the ruled line 139,140,142 and 143 is used. The value is referred to W4 shown in FIG. 26(D).

By using the width of the ruled line of the different image pattern decided by like this, it is found whether the identified ruled line width of the potential match of the ruled line is wide or narrow. For example, when the width of the identified potential match of the ruled line is more than three times over the width of the different image pattern existing around the identified potential match of the ruled line, the ruled line width is considered as wide, and when the width of the identified potential match of ruled line is less than ⅓ times of the different image pattern existing around the identified potential match of the ruled line, the ruled line width is considered as narrow. In the case of the potential match of the ruled line 135 shown in FIG. 25(A), as the width W1 of the potential match of the ruled line 135 is more than 3 times of the mean value of width W2 of the potential match of the ruled line 133 etc., the potential match of the ruled line 135 is decided as wide. In the case of the potential match of the ruled line 141 shown in FIG. 26(A), as the width W3 of the potential match of the ruled line 141 is less than ⅓ times of the mean value of width W4 of the potential match of the ruled line 139 etc., the potential match of the ruled line 141 is decided as wide.

Next, based on the result finding the ruled line width, the first finding process is implemented by using the first threshold (step S263-2). An object of the process is a potential match of the ruled line of which width is decided more wide than the difference potential match of the ruled line existing around the identified potential match of the ruled line shown in FIG. 25.

The gross part 135 of the potential match of the ruled line shown in FIG. 25(A) is a character existing between ruled lines in itself. Therefore, as there is a true ruled line around the image patter, as mentioned above, the width of the different image pattern existing around the identified gross potential match of the ruled line is less than the identified gross potential match of the ruled line 135. As the width of the different image pattern is fine, the possibility that the image pattern 135 is a crushed character is high. Therefore, it is necessary that the potential math of the ruled line having fairly low roughness (that is smooth) is left as a ruled line. Accordingly, the first threshold 21 having the low value is used. The roughness of the letter extracted as the potential match of the ruled line 135 is low, though it is high in itself. When the second threshold 22 having higher value is used, it happens that the roughness of the gross potential match of the ruled line (character) 135 is less the second threshold 22, as the result, the gross potential match of the ruled line 135 is considered incorrectly as a ruled line. By using the first threshold 21, the roughness of the gross potential match of the ruled line is more than the first threshold 21, as the result, the gross potential match of the ruled line is decided as an image pattern except the ruled line, so that it is neglected from the potential match of the ruled line data 13A.

Next, based on the result of the width of the ruled line, the second finding process is implemented (step S262-3). An object of the process is a potential match of the ruled line that is decided narrower than the width of the different image pattern existing around the identified potential match of the ruled line shown in FIG. 26. By the way, it is allowed whichever the second process and the first finding process (step S263-2) is implemented first.

A fine part 141 of the potential match of the ruled line shown in FIG. 26(A) is unclear, but it is a ruled line in itself. Therefore, there are true ruled lines around the identified potential match of the ruled line, so that the width of the difference image pattern existing around the identified potential match of the ruled line is grosser than the fine identified potential match of the ruled line 141. As the width of the deferent image pattern is gross, the possibility that the identified potential match of the ruled line 141 is a fine unclear ruled line is high. It is necessary for a potential match of the ruled line having a considerable roughness (that is, having unevenness in a some extent) to be left as a potential match of the ruled line therefore. The second threshold 22 of high value is used therefore. The roughness of the fine ruled line extracted as a potential match of ruled line is fairy high, although it is low in itself. When the first threshold 21 of low value is used, the roughness of the fine potential match of the ruled line 141 is greater than the first threshold 21, as the result, it happens for the fine potential match of the ruled line 141 to be an image pattern (a letter) except a ruled line. By using the second threshold 22, the roughness of the fine potential match of the ruled line 141 is smaller than the second threshold 22, so that it is decided as a ruled line. That is, it is left in the potential match of the ruled line.

As the result, the gross potential match of the ruled line 135, which is extracted as a potential match of the ruled line because of an incorrect input image, is neglected from the potential match of the ruled line 13A, and the fine potential match of the ruled line 141 is left in the potential match of the ruled line data 13A. As mentioned above, the table image processing device of the present invention implements the process for finding the potential match of the ruled line based on the roughness, so that it can find exactly the potential match of the ruled line, even if there are crushed characters or unclearness of the ruled line.

As the result of the process mentioned above, the potential matches of the ruled line which is a low possibility for the ruled line are neglected from the potential match of the ruled line 13A, and the ruled line data which the potential match of the ruled lines having the high possibility as ruled lines are left, that is, the line data 12 is extracted.

As mentioned above, another mode for implementing the present invention is explained, but the present invention can be modified variously in a scope of subject matters.

For example, the table image process device 100 can be combined with the first mode for implementing the present invention. That is, the table image process device 100 may composed of the line extracting device 2, the potential match of the round corner finding device 3, the cell extracting device 4, the round corner part deciding device 5, and the character recognition region deciding device 6. Further, the table image process device can be combined with the second mode for implementing the invention and the first mode for implementing the invention explained as a simplified table image processing device 100. Further, the table image process device 100 can be combined with the second mode for implementing the invention and the first mode for implementing the invention which neglects the potential match of round corner finding device 3 and the round corner part finding device 5. That is, the table image processing device 100 may comprise the line extracting device 2, cell extracting device 4 and the character recognition region deciding device 6.

As mentioned above, the table image processing device of the present invention extracts an oblique element starting from a terminal of an extracted line, decides a round corner by a fixed process using the extracted oblique element concerning to a round corner of the cell containing potential match of the round corner region, so that the present invention prevents to recognize contacts part of letters with the ruled line and the part of unclearness in the image as the round corner. Therefore, the round corner is recognized exactly in spite of the existence of the unclearness of the ruled line or the round corner of the character, the contact of letters with the ruled line etc. As the result, the recognition of a table form, extraction of cells the region for recognizing characters) can be implemented certainly.

According to the present invention, a program memory medium storing a program realizing a table image processing device by implementing the program in a computer is provided, so that the table image processing device which extracts certainty the recognition of the ruled line form containing the round corner, and cell (the region for recognizing characters) can be provided.

Further the table image process device of the present invention finds the roughness of the identified potential match of the ruled line by using one of the first threshold and the second threshold according to the difference image patterns existing around the identified potential match of the ruled line, so that, for example, in the case that the roughness of the difference image pattern, a potential match of the ruled line of which the roughness is low, nevertheless high in it itself, can be neglected from the potential match of the ruled line by using the low value threshold (for example, the first threshold). On the contrary, in the case that the roughness of the difference pattern of the image pattern around the identified potential match of the ruled line is low, a potential match of ruled line of which the roughness is high, nevertheless it is low in itself, can be left in the potential match of the ruled line by using the high value threshold (for example, the second threshold). As the result, the case impossible finding the ruled line or a pattern other than the ruled line is few, and the ruled line can be found precisely.

According to the present invention, a program memory medium storing a program realizing a table image processing device by implementing the program in a computer is provided, so that the table image processing device which finds precisely the ruled line can be provided.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A table image processing device comprising:
   a unit inputting an image comprising a sheet image including ruled lines;
   a unit extracting a line by extracting a longitudinal line and a lateral line from the input image;
   a unit finding a potential match of a round corner region by extracting an oblique line which commences from a terminal of a line found by the line extracting unit, and finding a potential match of the round corner region based on the oblique line;
   a unit extracting a cell finding cells containing the potential match of the round corner found by the potential match of the round corner region finding unit; and
   a unit deciding a round corner part decides a round corner based on the cells found by the cell extracting unit;
   wherein the unit finding the potential match of the round corner region extracts the oblique element by extracting a first oblique element commencing from a terminal of a longitudinal line, and a second oblique element commencing from a terminal of a lateral line, and
   the unit finding the potential match of the round corner region decides, in a case that the first oblique element and the second oblique element overlap, the part as the potential match of the round corner, even when at least one of the first and the second oblique elements are unclear; and
   the unit deciding a round corner part decides the part as the round corner in a case that the pixel density at a corner of a cell extracted by the unit extracting the cell changes in a fixed order of low density-high density-low density from outside of the corner area.

2. The table image processing device according to claim 1, wherein the unit deciding a round corner part, after finding the round corner part based on the pixel density change, finds whether the regulation of the ruled line arrangement exists or not, and when the regulation of the ruled line arrangement exists, the unit deciding a round corner part decides another corner of the input image as a round corner.

3. The table image processing device according to claim 1, wherein the unit deciding a round corner, in the case that the round corner is not found based on the pixel density change, the unit deciding a round corner compares generated patterns connecting the terminals of the longitudinal lines or the lateral lines with the round corner part of the input image, and decides the part as the round corner part, when the patterns are matched each other.

4. The table image processing device according to claim 3, wherein the unit deciding a round corner decides, in case that a pattern of nth order function generated between the terminals of lines extracted by the unit extracting line matches the round corner part of the input image, the part as the round corner.

5. The table image processing device according to claim 1, wherein the oblique element is decomposed to a longitudinal direction and a lateral direction, and each element is supposed as ruled lines of the longitudinal direction and the lateral direction.

6. A table image processing device comprising:
a unit inputting an image comprising a sheet image including ruled lines;
a unit extracting a line by extracting a longitudinal line and a lateral line from the input image;
a unit finding a potential match of a round corner region by extracting an oblique line which commences from a terminal of a line found by the line extracting unit, and finding a potential match of the round corner region based on the oblique line;
a unit extracting a cell finding cells containing the potential match of the round corner found by the potential match of the round corner region finding unit; and
a unit deciding a round corner part decides a round corner based on the cells found by the cell extracting unit;
wherein the unit finding the potential match of the round corner region extracts the oblique element by extracting a first oblique element commencing from a terminal of a longitudinal line, and a second oblique element commencing from a terminal of a lateral line even when at least one of the first and the second oblique elements are unclear; and
wherein the unit finding a potential match of a round corner region decides the part as the potential match of the round corner by two processes of the process (A), (B) and (C) in the following:
(A) process that the part is decides as the potential match of the round corner, in the case that the first oblique element and the second oblique element overlap;
(B) process that the part is decided as the potential match of the round corner, in the case that the distance between the first and the second oblique line found by calculating the distance is within a fixed value; and
(C) the process that the part is decided as the potential match of the round corner in the case that any another oblique element does not exist near an identified oblique element and there is a pattern showing a line feature at the terminal of the identified oblique line; and
wherein the unit deciding a round corner part decides the part as the round corner in the case that the pixel density at a corner of a cell extracted by the unit extracting the cell changes in a fixed order of low density-high density-low density from outside of the corner area.

7. The table image processing device according to claim 6, wherein the unit deciding a round corner part, after finding the round corner part based on the pixel density change, finds whether the regulation of the ruled line arrangement exists or not, and when the regulation of the ruled line arrangement exists, the unit deciding a round corner part decides another corner of the input image as a round corner.

8. The table image processing device according to claim 6, wherein the unit deciding a round corner, in the case that the round corner is not found based on the pixel density change, the unit deciding a round corner compares generated patterns connecting the terminals of the longitudinal lines or the lateral lines with the round corner part of the input image, and decides the part as the round corner part, when the patterns are matched each other.

9. A table image processing device comprising:
a unit inputting an image comprising a sheet image including ruled lines;
a unit extracting a line by extracting a longitudinal line and a lateral line from an input image;
a unit finding a potential match of a round corner region by extracting an oblique line which commences from a terminal of a line found by the line extracting unit, and finding a potential match of the round corner region based on the oblique line;
a unit extracting a cell finding cells containing the potential match of the round corner found by the potential match of the round corner region finding unit; and
a unit deciding a round corner part decides a round corner based on the cells found by the cell extracting unit;
wherein the unit finding the potential match of the round corner region extracts the oblique element by extracting a first oblique element commencing from a terminal of a longitudinal line, and a second oblique element commencing from a terminal of a lateral line, even when at least one of the first and the second oblique elements are unclear; and
wherein the unit finding a potential match of a round corner region decides the part as the potential match of the round corner by the process (A), (B) and (C) in the following:
(A) process that the part is decides as the potential match of the round corner, in a case that the first oblique element and the second oblique element overlap;
(B) process that the part is decided as the potential match of the round corner, in the case that the distance between the first and the second oblique line found by calculating the distance is within a fixed value; and
(C) the process that the part is decided as the potential match of the round corner in the case that any another oblique element does not exist near an identified oblique element and there is a pattern showing a line feature at the terminal of the identified oblique line; and
wherein the unit deciding a round corner part decides the part as the round corner in the case that the pixel density at a corner of a cell extracted by the unit extracting the cell changes in a fixed order of low density-high density-low density from outside of the corner area.

10. The table image processing device according to claim 9, wherein the unit deciding a round corner part, after finding the round corner part based on the pixel density change, finds whether the regulation of the ruled line arrangement exists or not, and when the regulation of the ruled line arrangement exists, the unit deciding a round corner part decides another corner of the input image as a round corner.

11. The table image processing device according to claim 9, wherein the unit deciding a round corner, in the case that the round corner is not found based on the pixel density change, the unit deciding a round corner compares generated patterns connecting the terminals of the longitudinal lines or the lateral lines with the round corner part of the input image, and decides the part as the round corner part, when the patterns are matched each other.

12. The table image processing device according to claim 9, wherein the unit deciding a round corner part decides the part as the round corner by based on the pixel density; and in the case that the round corner is not found based on the pixel density change, the unit deciding a round corner part finds whether the regulation of the ruled line arrangement exists or not, and when the regulation exists, decides another corner of the input image as a round corner; and wherein in the case that the round corner is not found in the round corner finding process based on the pixel density change and the regulation, the unit deciding a round corner compares generated patterns made by connecting the terminals of the longitudinal lines or the lateral lines with the round corner part of the input image, and decides the part as the round corner part, when the patters are matched each other.

13. The table image processing device according to claim 9, further comprising:

a unit finding regions recognizing character finding the character recognition region by neglecting the round corner part decided by the unit deciding round corner in the cells containing the round corner.

14. A memory medium storing a program for implementing in a computer a table image processing device, wherein the program comprises:

inputting an image comprising a sheet image including ruled lines;

extracting a line by extracting a longitudinal line and a lateral line from the input image;

finding a potential match of a round corner region by extracting an oblique line which commences from a terminal of a line found by the line extracting process, and finding a potential match of the round corner region based on the oblique line, even when the oblique line is unclear;

extracting a cell finding cells containing the potential match of the round corner found by the potential match of the round corner region finding process; and deciding a round corner part decides a round corner based on the cells found by the cell extracting process;

wherein finding the potential match of the round corner region extracts the oblique element by extracting a first oblique element commencing from a terminal of a longitudinal line, and a second oblique element commencing from a terminal of a lateral line, and finding the potential match of the round corner region decides, in a case that the first oblique element and the second oblique element overlap, the part as the potential match of the round corner; and deciding a round corner part decides the part as the round corner in a case that the pixel density at a corner of a cell extracted by the unit extracting the cell changes in a fixed order of low density-high density-low density from outside of the corner area.

15. A memory medium storing a program for implementing in a computer a table image processing device, the program comprising:

extracting a line by extracting a longitudinal line and a lateral line from the input image;

finding a potential match of a round corner region by extracting an oblique line which commences from a terminal of a line found by the line extracting process, and finding a potential match of the round corner region based on the oblique line, even when the oblique line is unclear;

extracting a cell finding cells containing the potential match of the round corner found by the potential match of the round corner region finding process; and deciding a round corner part decides a round corner based on the cells found by the cell extracting process;

wherein finding the potential match of the round corner region extracts the oblique element by extracting a first oblique element commencing from a terminal of a longitudinal line, and a second oblique element commencing from a terminal of a lateral line; and wherein finding a potential match of a round corner region decides the part as the potential match of the round corner by two processes of the process (A), (B) and (C) in the following:

(A) deciding as the potential match of the round corner, in the case that the first oblique element and the second oblique element overlap;

(B) deciding as the potential match of the round corner, in the case that the distance between the first and the second oblique line found by calculating the distance is within a fixed value; and (C) deciding as the potential match of the round corner in the case that any another oblique element does not exist near an identified oblique element and there is a pattern showing a line feature at the terminal of the identified oblique line; and wherein deciding a round corner part decides the part as the round corner in the case that the pixel density at a corner of a cell extracted by the unit extracting the cell changes in a fixed order of low density-high density-low density from outside of the corner area.

16. A table image processing device comprising:

a unit extracting a line extracting longitudinal lines and lateral lines from an input image;

a unit deciding region recognizing character deciding region recognizing character;

a unit finding a ruled line by using the longitudinal lines and the lateral lines extracted from the unit extracting lines as the potential match of the ruled line and for deciding whether the potential match of the ruled line is a ruled line or not, even when the ruled line is unclear, and the unit extracting cells based on the result decided by the unit finding ruled line;

wherein the unit finding ruled line finds whether the identified potential match of the ruled line is a ruled line or not based on roughness of the potential match of the ruled line and any one of threshold of different plural thresholds corresponding to another image pattern extracted from the input image pattern existing around the identified potential match of the ruled line, and the unit finding ruled line comprises at least one unit of a pixel density finding unit (A) and a ruled line width finding unit (B);

the pixel density finding unit (A) finding comprising a first threshold fixed in advance and a second threshold fixed in advance higher than the first threshold, and the pixel density finding unit, corresponding to the pixel density of the image pattern existing around the identified potential match of the ruled line, uses the first threshold in the case that the pixel density of the image pattern other than the identified potential match of ruled line is high, and uses the second threshold in a case that the pixel density of the image pattern other than the identified potential match of ruled line is low; and wherein:

the ruled line width finding unit (B) comprising the first threshold fixed in advance or the second threshold fixed in advance higher than the first threshold, and the ruled line width finding unit, corresponding to the width of the image pattern existing around the identified potential match of the ruled line, uses the first threshold in a case that the width of the image pattern is wide, and uses the second threshold in a case that the width of the image pattern is narrow when the potential match of the ruled line is a longitudinal line, an image pattern of same length as the potential match of the ruled line existing right and left of the potential match of the ruled line within a fixed range is used as the image pattern existing around the potential match of the ruled line, when the potential match of the ruled line is a lateral line, an image pattern of same length as the potential match of the ruled line existing up and under of the potential match of the ruled line within a fixed range is used as the image pattern existing around the identified potential match of the ruled line.

17. The table image processing device according to claim 16, wherein the ruled line width finding unit uses the potential match of the ruled line extending to same direction as the identified potential match of ruled line and adjacent or connected to the identified potential match of ruled line as the image pattern existing around the identified potential match of ruled line.

18. The table image processing device according to claim 16, wherein the ruled line width finding unit decides that the width of the potential match of the ruled line is wide in the case that the width of potential match of ruled line is grater than the n times of the width of the image pattern existing around the identified potential match of ruled line, and the width of the potential match of the ruled line is narrow in a case that the width of potential match of ruled line is less than the 1/n times of the width of the image pattern existing around the identified potential match of ruled line.

19. A table image processing device comprising:

a unit extracting a line extracting longitudinal lines and lateral lines from an input image;

a unit deciding region recognizing character deciding region recognizing character;

a unit finding a ruled line by using the longitudinal lines and the lateral lines extracted from the unit extracting lines as the potential match of the ruled line and for deciding whether the potential match of the ruled line is a ruled line or not, even when the ruled line is unclear, and the unit extracting cells based on the result decided by the unit finding ruled line;

wherein the unit finding the ruled line finds whether the identified potential match of the ruled line is a ruled line or not based on roughness of the potential match of the ruled line and any one of threshold of different plural thresholds corresponding to another image pattern extracted from the input image pattern existing around the identified potential match of the ruled line, and the unit finding ruled line comprises a pixel density finding unit (A) and a ruled line width finding unit (B);

the pixel density finding unit (A) finding comprising a first threshold fixed in advance and a second threshold fixed in advance higher than the first threshold, and the pixel density finding unit, corresponding to the pixel density of the image pattern existing around the identified potential match of the ruled line, uses the first threshold in a case that the pixel density of the image pattern other than the identified potential match of ruled line is high, and uses the second threshold in a case that the pixel density of the image pattern other than the identified potential match of ruled line is low; and wherein the ruled line width finding unit (B) comprising the first threshold fixed in advance or the second threshold fixed in advance higher than the first threshold, and the ruled line width finding unit, corresponding to the width of the image pattern existing around the identified potential match of the ruled line, uses the first threshold in a case that the width of the image pattern is wide, and uses the second threshold in a case that the width of the image pattern is narrow.

20. The table image processing device according to claim 19 further comprising a unit finding the potential match of the round corner region and a unit deciding a round corner part, wherein the unit finding the potential match of the round corner region extracts the oblique element by extracting a first oblique element commencing from a terminal of a longitudinal line, and a second oblique element commencing from a terminal of a lateral line, and the unit finding the potential match of the round corner region decides, in a case that the first oblique element and the second oblique element overlap, the part as the potential match of the round corner; and the unit deciding a round corner part decides the part as the round corner in a case that the pixel density at a corner of a cell extracted by the unit extracting the cell changes in a fixed order of low density-high density-low density from outside of the corner area.

21. A memory medium storing program for implementing in a computer of a table image processing device, the program comprising:

deciding region recognizing character deciding region recognizing character;

finding a ruled line by using the longitudinal lines and the lateral lines extracted from a unit extracting lines as the potential match of the ruled line and for deciding whether the potential match of the ruled line is a ruled line or not, even when the ruled line is unclear, and extracting cells based on the result decided by the process finding a ruled line;

wherein finding the ruled line finds whether the identified potential match of the ruled line is a ruled line or not based on roughness of the potential match of the ruled line and any one of threshold of different plural thresholds corresponding to another image pattern extracted from the input image pattern existing around the identified potential match of the ruled line, and finding ruled line comprises at least one unit of a pixel density finding process (A) and a ruled line width finding process (B);

the pixel density finding process (A) finding comprising a first threshold fixed in advance and a second threshold fixed in advance higher than the first threshold, and the pixel density finding process, corresponding to the pixel density of the image pattern existing around the identified potential match of the ruled line, uses the first threshold in a case that the pixel density of the image pattern other than the identified potential match of ruled line is high, and uses the second threshold in the case that the pixel density of the image pattern other than the identified potential match of ruled line is low; and wherein the ruled line width finding process (B) comprising the first threshold fixed in advance or the second threshold fixed in advance higher than the first threshold, and the ruled line width finding process, corresponding to the width of the image pattern existing around the identified potential match of the ruled line, uses the first threshold in a case that the width of the image pattern is wide, and uses the second threshold in a case that the width of the image pattern is narrow.

22. The memory medium storing program for implementing in a computer of a table image processing device according to claim 21, further comprising finding the potential match of the round corner region and deciding a round corner part, wherein finding the potential match of the round corner region extracts the oblique element by extracting a first oblique element commencing from a terminal of a longitudinal line, and a second oblique element commencing from a terminal of a lateral line, and finding the potential match of the round corner region decides, in the case that the first oblique element and the second oblique element overlap, the part as the potential match of the round corner; and deciding a round corner part decides the part as the round corner in a case that the pixel density at a corner of a cell extracted by the unit extracting the cell changes in a fixed order of low density-high density-low density from outside of the corner area.

23. A table image processing method comprising:

extracting a line extracting longitudinal lines and lateral lines from an input image;

deciding region recognizing character deciding region recognizing character;

finding a ruled line by using the longitudinal lines and the lateral lines extracted as the potential match of the ruled line and for deciding whether the potential match of the ruled line is a ruled line or not, even when the ruled line is unclear, and extracting cells based on the result of finding the ruled line;

wherein during the finding of the ruled line it is determined whether the identified potential match of the ruled line is a ruled line or not based on roughness of the potential match of the ruled line and any one of threshold of different plural thresholds corresponding to another image pattern extracted from the input image pattern existing around the identified potential match of the ruled line, and finding ruled line comprises finding at least one unit of a pixel density (A) and finding a ruled line width (B);

wherein, finding the at least one unit of a pixel density (A) comprises a first threshold fixed in advance, and a second threshold fixed in advance higher than the first threshold, and finding the at least one unit of a pixel density, corresponding to the pixel density of the image pattern existing around the identified potential match of the ruled line, uses the first threshold in the case that the pixel density of the image pattern other than the identified potential match of ruled line is high, and uses the second threshold in a case that the pixel density of the image pattern other than the identified potential match of ruled line is low; and wherein finding the ruled line width (B) comprises the first threshold fixed in advance or the second threshold fixed in advance higher than the first threshold, and finding the ruled line width finding corresponding to the width of the image pattern existing around the identified potential match of the ruled line, uses the first threshold in a case that the width of the image pattern is wide, and uses the second threshold in a case that the width of the image pattern is narrow.

24. The table image processing method according to claim 23 further comprising:

finding a potential match of a round corner region by extracting an oblique line which commences from a terminal of a line found by the line extracting process, and finding a potential match of the round corner region based on the oblique line;

extracting a cell finding cells containing the potential match of the round corner found by the potential match of the round corner region finding process; and deciding a round corner part based on the cells found by the cell extracting process;

wherein finding the potential match of the round corner region extracts the oblique element by extracting a first oblique element commencing from a terminal of a longitudinal line, and a second oblique element commencing from a terminal of a lateral line, and finding the potential match of the round corner region decides, in a case that the first oblique element and the second oblique element overlap, the part as the potential match of the round corner; and deciding a round corner part decides the part as the round corner in a case that the pixel density at a corner of a cell extracted by the process extracting the cell changes in a fixed order of low density-high density-low density from outside of the corner area.

* * * * *

UNITED STATES PATENT AND TRADEMARK OFFICE
CERTIFICATE OF CORRECTION

| | | |
|---|---|---|
| PATENT NO. | : 7,133,558 B1 | Page 1 of 1 |
| APPLICATION NO. | : 09/410626 | |
| DATED | : November 7, 2006 | |
| INVENTOR(S) | : Atsuko Ohara et al. | |

It is certified that error appears in the above-identified patent and that said Letters Patent is hereby corrected as shown below:

Column 37, Line 27, after "line" insert --,--.

Column 39, Line 14, change "patters" to --patterns--.

Column 41, Line 29, change "grater" to --greater--.

Column 43, Line 29-30, after "character" delete "deciding region recognizing character". (Second Occurrence)

Signed and Sealed this

Twenty-first Day of August, 2007

JON W. DUDAS
*Director of the United States Patent and Trademark Office*